(12) United States Patent
Fairchild et al.

(10) Patent No.: US 6,565,678 B2
(45) Date of Patent: May 20, 2003

(54) WELD METALS WITH SUPERIOR LOW TEMPERATURE TOUGHNESS FOR JOINING HIGH STRENGTH, LOW ALLOY STEELS

(75) Inventors: Douglas P. Fairchild, Sugar Land, TX (US); Jayoung Koo, Bridgewater, NJ (US); Narasimha-Rao V. Bangaru, Annandale, NJ (US); Mario Luis Macia, Bellaire, TX (US); Danny Lee Beeson, Houston, TX (US); Adnan Ozekcin, Bethlehem, PA (US)

(73) Assignee: ExxonMobil Upstream Research Company, Houston, TX (US)

( * ) Notice: Subject to any disclaimer, the term of this patent is extended or adjusted under 35 U.S.C. 154(b) by 0 days.

(21) Appl. No.: 09/920,894

(22) Filed: Aug. 2, 2001

(65) Prior Publication Data

US 2002/0043305 A1 Apr. 18, 2002

Related U.S. Application Data

(60) Provisional application No. 60/223,495, filed on Aug. 7, 2000.

(51) Int. Cl.[7] .................. C22C 38/08; C22C 38/04; B23K 9/04
(52) U.S. Cl. .............. 148/336; 148/320; 148/529; 219/137 WM; 228/262.41
(58) Field of Search ................. 148/320, 336, 148/529; 219/137 WM; 228/262.41

(56) References Cited

U.S. PATENT DOCUMENTS

| | | |
|---|---|---|
| 3,867,608 A | 2/1975 | Ohwa et al. ............ 219/73 |
| 4,143,258 A | 3/1979 | McCann et al. ......... 219/73 |
| 5,106,010 A | 4/1992 | Stueber et al. ......... 228/232 |
| 5,300,751 A | 4/1994 | Endo et al. ............ 219/61 |
| 5,374,319 A | 12/1994 | Stueber et al. ........ 148/404 |
| 5,523,540 A | 6/1996 | Coldren et al. ..... 219/137 WM |
| 5,837,956 A | 11/1998 | Okabe et al. .......... 219/61 |
| 6,114,656 A | 9/2000 | Fairchild ......... 219/137 WM |
| 6,300,596 B1 | 10/2001 | Bonnet et al. ..... 219/137 WM |

FOREIGN PATENT DOCUMENTS

| | | |
|---|---|---|
| JP | 54-39333 A | 3/1979 |
| JP | 60-184663 A | 9/1985 |
| JP | WO98/22255 | 5/1998 |

OTHER PUBLICATIONS

DeLoach, J.J.; Null, C; Fiore, S; and Konkol P. *The Right Welding Wire Could Help the U.S. Navy Save Millions*, Welding Journal (Jun. 1999) pp. 55–58.

*Primary Examiner*—Deborah Yee
(74) *Attorney, Agent, or Firm*—Marcy Hoefling

(57) ABSTRACT

Weld metals suitable for joining high strength, low alloy steels are provided. These weld metals have microstructures of acicular ferrite interspersed in a hard constituent, such as lath martensite, yield strengths of at least about 690 MPa (100 ksi), and DBTTs lower than about −50° C. (−58° F.) as measured by a Charpy energy versus temperature curve. These weld metals include about 0.04 wt % to about 0.08 wt % carbon; about 1.0 wt % to about 2.0 wt % manganese; about 0.2 wt % to about 0.7 wt % silicon; about 0.30 wt % to 0.80 wt % molybdenum; about 2.3 wt % to about 3.5 wt % nickel; about 0.0175 wt % to about 0.0400 wt % oxygen, and at least one additive selected from the group consisting of (i) up to about 0.04 wt % zirconium, and (ii) up to about 0.02 wt % titanium.

21 Claims, 18 Drawing Sheets

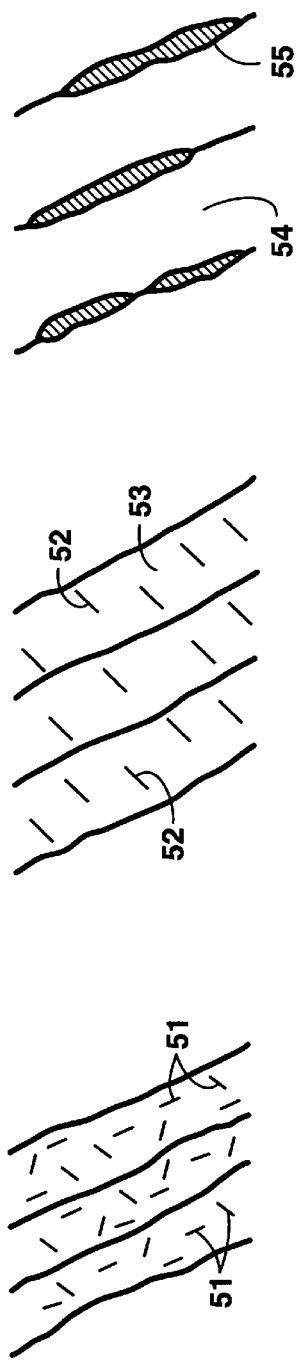
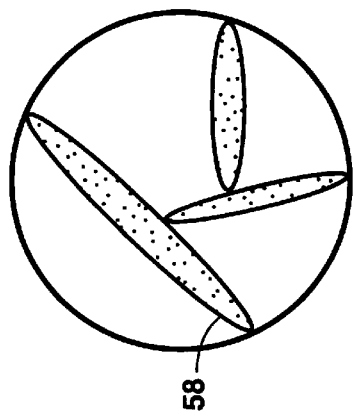
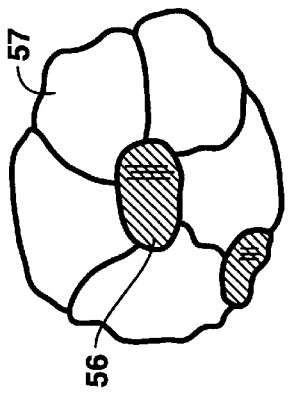
FIG. 5A   FIG. 5B   FIG. 5C   FIG. 5D   FIG. 5E

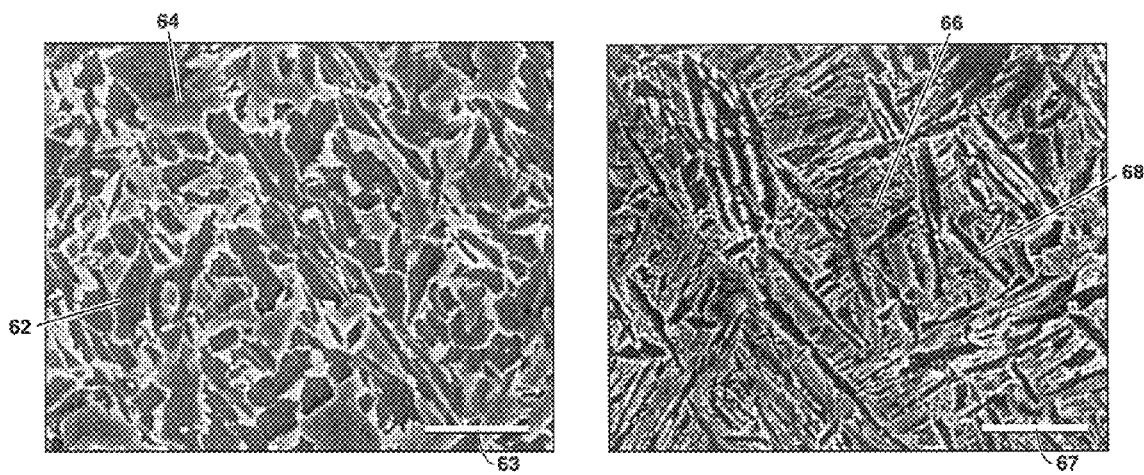
*FIG. 6A*                    *FIG. 6B*

WELD METALS WITH SUPERIOR LOW TEMPERATURE TOUGHNESS FOR JOINING HIGH STRENGTH, LOW ALLOY STEELS

This application claims the benefit of U.S. Provisional Application No. 60/223,495, filed Aug. 7, 2000.

FIELD OF THE INVENTION

This invention relates to weld metals with superior low temperature toughness for joining high strength, low alloy steels. This invention also relates to welding consumable wires and welding methods for producing such weld metals. Weld metals produced by the welding consumable wires and welding methods of this invention have microstructures that provide superior strength, toughness, and hydrogen cracking resistance. The welding consumable wires and welding methods of this invention are particularly well suited for mechanized field girth welding of high strength steel linepipe using the gas metal arc welding process to construct pipelines.

BACKGROUND OF THE INVENTION

Various terms are defined in the following specification. For convenience, a Glossary of terms is provided herein, immediately preceding the claims.

For industries that utilize steel structures, e.g., oil & gas, chemical, ship building, power generation, etc., it has become apparent that the selected use of high strength, low alloy (HSLA) steels is desirable. As used herein, "high strength, low alloy (HSLA) steel" includes any steel containing iron and less than about 10 wt % total alloy additives and having a yield strength of at least about 550 MPa (80 ksi). Utilizing a HSLA steel can result in lower costs for a structure due to the lower weight of the structure compared to that of the same structure built of a lower strength steel. Also, the use of HSLA steels can enable a structure to be built that could not practically be built using a lower strength steel because very thick material would be necessary to provide structural strength, resulting in unacceptably high weight.

However, utilizing HSLA steels in some of the aforementioned structures may have certain drawbacks. Many commercially available HSLA steels are limited in their use, as compared to lower strength steels, particularly in fracture critical applications, because of the limited toughness (thus, limited defect tolerance) of their weldments. (See Glossary for definition of fracture critical.) Toughness in steel weldments may be considered from the standpoint of the ductile-to-brittle transition temperature (DBTT) as measured by the Charpy V-notch test, from the magnitude of the absorbed Charpy V-notch energy at specific temperatures, or from the magnitude of the fracture toughness at specific temperatures as measured by a test like the crack tip opening displacement (CTOD) test or the J-integral test; all of these toughness testing techniques being familiar to those skilled in the art. (See Glossary for definition of DBTT.)

Another potential drawback associated with the use of HSLA steels is the susceptibility for hydrogen cracking in their weldments. As the strengths of weld metals increase, their alloy contents typically increase, which creates higher hardenability and a tendency for transformation to martensite. The increased presence of martensite in higher strength weld metals combined with the higher residual stresses in higher strength weldments, generally leads to greater sensitivity for hydrogen cracking, as compared to lower strength weldments. In order to decrease the likelihood of hydrogen cracking in the weldments of HSLA steels, the steels are often preheated prior to welding, which can increase fabrication costs.

In addition to commercially available HSLA steels, new HSLA steels with superior strengths, e.g., yield strength of at least about 690 MPa (100 ksi), preferably at least about 760 MPa (110 ksi), more preferably at least about 828 MPa (120 ksi), and even more preferably at least about 896 MPa (130 ksi), and most preferably at least about 931 MPa to 966 MPa (135 to 140 ksi) are currently under development. For example, see International Application nos. WO 99/05336, WO 99/05334, WO 99/05328, WO 99/05335, and WO 98/38345. These new HSLA steels are particularly well suited for manufacturing high strength linepipe for constructing pipelines. For pipeline applications, the girth welds used to join individual linepipe segments preferably provide a high level of toughness due to the fracture critical nature of their service. Additionally, in certain environments, e.g., in arctic applications, the required girth weld toughness may need to be achieved at ambient temperatures as low as about −40° C. (−40° F.), or even as low as −60° C. (−76° F.). Therefore, in order to utilize commercially available HSLA steels, or the new HSLA steels currently under development, at low ambient temperatures, welding consumable wires and welding methods that provide weld metals and weldments with adequate strength, hydrogen cracking resistance, and, most importantly, toughness, at such temperatures are required.

Broadly speaking, there are two classes of welding wires and, therefore, weld metals, that are currently available for the purpose of joining HSLA steels with yield strengths in the range of about 690 MPa (100 ksi) to about 931 MPa (135 ksi). The first class of weld metal is commonly referred to by an acronym related to its microstructure, "LCBF", which stands for low carbon bainitic ferrite. This type of weld metal is described in U.S. Pat. No. 5,523,540. The second class of weld metal is the martensitic type, which is also described in U.S. Pat. No. 5,523,540.

The LCBF weld metals were invented as an improvement over the martensitic type for welding of naval hull materials. One goal was that the LCBF microstructure be producible over a wide range of welding heat inputs. Examples of welds made at heat inputs from about 1.2 kJ/mm (30 kJ/in.) to 5 kJ/mm (127 kJ/in.) are given in U.S. Pat. No. 5,523,540. It is noted in U.S. Pat. No. 5,523,540 that it is necessary to provide relatively fast cooling rates to ensure that the martensitic-type weld metals transform completely to martensite. However, when applying a wide range of cooling rates to the LCBF weld metals, the microstructure transforms entirely to bainite, and martensite is avoided. Another goal of the LCBF weld metals is avoidance of hydrogen cracking without the requirement for preheating to drive off hydrogen. This permits a cost savings during fabrication. Meeting these goals for welding naval hull materials places certain demands on the chemistry for the LCBF weld metals, particularly on the carbon content. The LCBF weld metals described in U.S. Pat. No. 5,523,540 are limited to a maximum of 0.05 wt percent carbon, primarily to avoid martensite formation. It is generally believed that the LCBF microstructure is more stable over broad heat input ranges and that it is more resistant to hydrogen cracking than martensite.

In contrast to naval hull welding where avoidance of preheating is desired, preheating is routinely used in pipeline girth welding even for nominally low alloy grades of steel like API 5L X-65. Because of the fracture critical nature of each girth weldment and the expense associated with pipeline repairs, avoidance of hydrogen cracking in pipeline girth weldments is desirable. The use of preheating in pipeline girth welding is often seen as necessary to avoid or minimize hydrogen cracking that may otherwise occur under rugged field conditions that can result in less than optimal cleanliness. Pipeline construction using mechanized equipment can proceed at a rate of 100 to 400 welds per day (depending on the equipment employed and whether construction is onshore or offshore). Because hydrogen cracking can occur more than one or two days after welding, costly remedial action can result from the occurrence of this type of cracking during pipelaying. Thus, in the pipeline industry, welding preheat is seen as relatively cheap insurance to avoid hydrogen cracking and associated field repairs. This is particularly the case for offshore pipelines where the welds become essentially inaccessible soon after welding, and it is more cost effective to apply moderate preheat than it is to "pick-up" the constructed offshore line and conduct a repair.

With respect to structural integrity, each girth weld in a gas pipeline is fracture critical. Leaks result when any weldment defect penetrates or propagates through the entire pipeline wall. In this case, the pipeline fails to perform its intended function. For naval hulls, however, there is a greater degree of structural redundancy. Very few welds are fracture critical to the extent that if one fractures, the ship will fail to perform its intended function.

Concerning heat input demands, naval hull welding is conducted with a wide range of heat inputs, whereas field pipeline girth welding places natural limitations on the welding procedure. Field pipeline girth welds require all-position welding on relatively thin material (typically, from about 8 mm (0.3 in.) to about 25 mm (1 in.) wall thicknesses). Many naval hull welds are made on thick sections (up to about 50 mm (2 in.)) in the flat position where relatively high heat inputs can be used. The all-position demands of field pipeline welding restricts the heat input to relatively low levels.

While the LCBF weld metal described in U.S. Pat. No. 5,523,540 may be suitable for joining HSLA steels for use in naval hulls, the LCBF weld metal is not optimal for the girth welding of pipelines whereby the desired yield strength is at least about 690 MPa (100 ksi). The heat input and preheating requirements for pipeline girth welding are distinctly different from the requirements for welding of naval hull steels. A need exists for welding techniques that generate weld metals having yield strengths in excess of at least about 690 MPa (100 ksi) and superior low temperature toughness, particularly when the welding heat input is relatively low and moderate preheat is applied. Such welding techniques would be particularly well suited for mechanized pipeline girth welding.

Therefore, an object of this invention is to provide weld metals for joining HSLA steels, which weld metals possess distinct microstructural features that are different from the LCBF and martensitic types of weld metals and provide superior combinations of toughness at low temperatures, high strength, and hydrogen cracking resistance, particularly when used for mechanized pipeline girth welding. A further object of this invention is to provide welding consumable wires and specific welding methods for producing such weld metals. Further objects are made apparent by the following description of the invention.

SUMMARY OF THE INVENTION

Consistent with the above-stated objects of the present invention, weld metals suitable for joining HSLA steels are provided. Weld metals according to this invention comprise iron, about 0.04 wt % to about 0.08 wt % carbon; specified amounts of manganese, silicon, molybdenum, nickel, and oxygen; and at least one additive selected from the group consisting of zirconium and titanium. The microstructure of weld metals according to this invention comprises from about 5 vol % to about 45 vol % acicular ferrite and at least about 50 vol % lath martensite (including auto-tempered and tempered lath martensite), degenerate upper bainite, lower bainite, granular bainite, or mixtures thereof. The balance of the microstructure may include ferrite, upper bainite, pearlite, or mixtures thereof. Also, welding consumable wires and welding methods are provided for producing the weld metals of this invention.

Weld metals produced according to this invention are particularly well suited for field girth welding of HSLA steel linepipe, particularly when the mechanized gas metal arc welding (GMAW) process is used. The microstructure of these weld metals provides high strength, good hydrogen cracking resistance, and superior low temperature toughness suitable for many cold weather applications down to about −40° C. (−40° F.), or even as low as −60° C. (−76° F.). Another advantage of this invention is that hydrogen cracking can be avoided when using these weld metals with preheats of less than about 150° C. (302° F.), and more preferably less than about 100° C. (212° F.). These weld metals are particularly well suited for relatively low heat input welding where moderate preheat is applied, for example, the mechanized field girth welding of HSLA steel linepipe using the gas metal arc welding (GMAW) process.

Weld metals according to this invention have DBTTs, as measured from a Charpy energy versus temperature curve, of lower than about −50° C. (−58° F.), preferably lower than about −60° C. (−76° F.), and more preferably lower than about −70° C. (−94° F.). With respect to the upper shelf energy of the Charpy transition curve, these weld metals have at least about 100 joules (J) (75 ft-lbs), preferably greater than about 135 J (100 ft-lbs), and more preferably greater than about 170 J (125 ft-lbs). With respect to fracture toughness, CTOD testing of these weld metals produces values of at least 0.10 mm, preferably at least 0.15 mm, more preferably at least 0.20 mm, and even more preferably at least 0.25 mm, and most preferably at least 0.30 mm at a test temperature of 0° C. (32° F.), preferably at about −10° C. (14° F.), more preferably at about −20° C. (−4 ° F.), even more preferably at about −30° C. (−22° F.), and most preferably at about −40° C. (−40° F.). Also with respect to fracture toughness, these weld metals produce $J_{IC}$ values of at least about 125 N/mm (0.7 ksi-in), preferably at least about 175 N/mm (1.0 ksi-in), more preferably at least about 225 N/mm (1.3 ksi-in) at a test temperature of about −10° C. (14° F.), preferably at about −20° C. (−4° F.), more preferably at about −30° C. (−22° F.), and most preferably at about −40° C. (−40° F.). (See Glossary for definition of $J_{IC}$ values.)

DESCRIPTION OF THE DRAWINGS

The advantages of the present invention will be better understood by referring to the following detailed description and the attached drawings in which:

FIG. 5A is a schematic illustration of lath martensite;

FIG. 5B is a schematic illustration of lower bainite;

FIG. 5C is a schematic illustration of degenerate upper bainite;

FIG. 5D is a schematic illustration of granular bainite;

FIG. 5E is a schematic illustration of acicular ferrite;

FIG. 6A is a scanning electron miscroscopy (SEM) micrograph showing a weld metal microstructure according to this invention;

FIG. 6B is another scanning electron miscroscopy (SEM) micrograph showing a weld metal microstructure according to this invention;

Figure 1B:
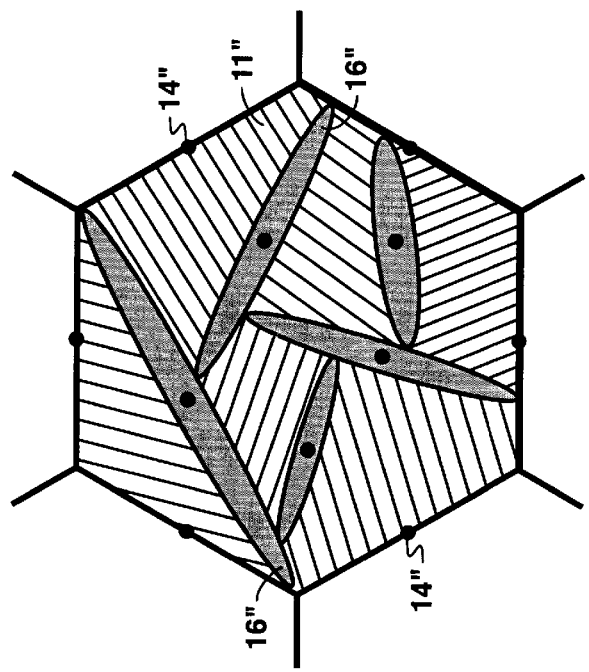
FIG. 1B is a schematic illustrating the key attributes of a weld metal microstructure according to this invention having a relatively low volume of acicular ferrite with a relatively high aspect ratio.

While the invention will be described in connection with its preferred embodiments, it will be understood that the invention is not limited thereto. On the contrary, the invention is intended to cover all alternatives, modifications, and equivalents which may be included within the spirit and scope of the present disclosure, as defined by the appended claims.

DETAILED DESCRIPTION OF THE INVENTION

A weld metal is provided, which weld metal comprises iron, about 0.04 wt % to about 0.08 wt % carbon, about 1.0 wt % to about 2.0 wt % manganese, about 0.2 wt % to about 0.7 wt % silicon, about 0.30 wt % to 0.80 wt % molybdenum, about 2.3 wt % to about 3.5 wt % nickel, about 0.0175 wt % to about 0.0400 wt % oxygen, and at least one additive selected from the group consisting of up to about 0.04 wt % zirconium and up to about 0.02 wt % titanium. A weld metal according to this invention can also comprise less than about 0.01 wt % phosphorus, less than about 0.01 wt % sulfur, up to about 0.03 wt % aluminum, and less than about 0.020 wt % nitrogen. Additionally, the weld metal can comprise at least one additive selected from the group consisting of up to about 0.60 wt % chromium, up to about 0.60 wt % copper, up to about 0.040 wt % vanadium, and up to about 0.0012 wt % boron. Given the chemical composition of the desired weld metal and the chemical composition of the steels(s) to be welded, one skilled in the art can determine the composition of the necessary consumable wire by well known methods. The microstructure of this weld metal comprises from about 5 vol % to about 45 vol % acicular ferrite and at least about 50 vol % lath martensite, degenerate upper bainite, lower bainite, granular bainite, or mixtures thereof. In one embodiment of this invention, the microstructure of the weld metal comprises from about 10 vol % to about 45 vol % acicular ferrite. The lath martensite constituent includes auto-tempered lath martensite and tempered lath martensite.

A primary advantage of weld metals of this invention is the combination of high strength and superior low temperature toughness provided by the presence, morphology, and quantity of a hard constituent, such as lath martensite, and a relatively soft phase, acicular ferrite, in the weld metal microstructure. Acicular ferrite is a type of ferrite well known to those skilled in the art that is commonly associated with steel weld metals that produce yield strengths less than about 690 MPa (100 ksi) and is known to have good toughness properties. The superior toughness of weld metals of this invention results primarily from a relatively low carbon content, small grain size, finely distributed acicular ferrite, and an oxide inclusion design that ensures a fine distribution of small inclusion particles in the weld metal microstructure.

The preferred welding method for producing weld metals of this invention is gas metal arc welding (GMAW), and even more preferred is pulsed GMAW welding.

General Description of the Microstructure

A superior combination of strength and toughness is provided by several key factors of the microstructure of a weld metal according to this invention. These factors are created by the weld metal chemistry and the welding technique described herein. The key components of the microstructure are a hard constituent, a relatively soft phase, and oxide inclusions. An important aspect is the way that the hard constituent is geometrically interspersed amongst the soft phase. Also key is the shape (aspect ratio) of the soft phase and the small size of the oxide inclusions.

Figure 1A:
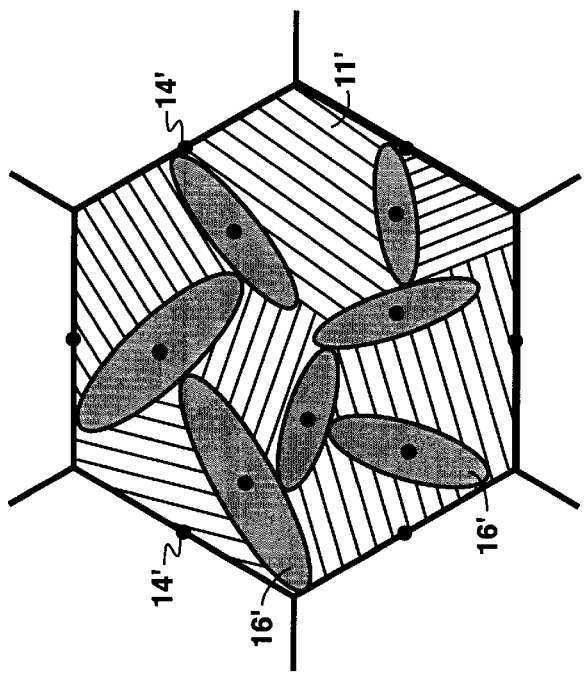
FIG. 1A is a schematic illustrating the key attributes of a weld metal microstructure according to this invention having a relatively high volume of acicular ferrite with a relatively low aspect ratio.

The microstructures that develop within weld metal prior austenite grains in weld metals according to this invention are shown schematically in FIG. 1A and FIG. 1B. Referring now to FIG. 1A and FIG. 1B, acicular ferrite comprises the soft phase 16', 16" of a weld metal microstructure according to this invention. Acicular ferrite 16', 16" increases toughness by subdividing prior austenite grains (see Glossary), thus creating an effective reduction in grain size. Acicular ferrite 16', 16" also provides deformation capacity (toughness) relative to the hard constituent 11', 11" of a weld metal microstructure according to this invention. Acicular ferrite 16', 16" is present in the weld metal microstructure in amounts from about 5 volume percent to about 45 volume percent. Hard constituent 11', 11" is the predominant component of the microstructure and provides high strength. As used herein, "predominant/predominantly" means at least about 50 volume percent. Lath martensite, including auto-tempered lath martensite and tempered lath martensite, is preferably the predominant constituent of hard constituent 11', 11". For a given volume percent of acicular ferrite in the microstructure, a hard constituent comprised of lath martensite will produce the highest strength. For microstructures of lower strengths, hard constituent 11', 11" may comprise a mixture of several constituents (not individually illustrated in FIG. 1A and FIG. 1B), including predominantly degenerate upper bainite and lath martensite. Hard constituent 11', 11" may also include lower bainite and granular bainite. A relatively small amount of retained austenite (typically less than 1 vol %) may also be present within hard constituent 11', 11". However, with the exception of retained austenite, in all instances of the present invention, the individual constituents comprising hard constituent 11', 11" have strengths exceeding that of acicular ferrite 16', 16".

A number of key features of the microstructure of weld metals according to this invention are different from the low carbon bainitic ferrite (LCBF) and martensitic weld metals, however, the basic difference is in the gross microstructure. Weld metals according to this invention have a combination of significant amounts of low carbon lath martensite (or hard constituent) with acicular ferrite in a specific geometrical arrangement. This contrasts to the LCBF or martensitic weld metals that are intentionally homogeneous; i.e., either completely bainite or completely martensite.

Oxide inclusions 14', 14" in microstructures of the present invention are preferably of fine distribution, that is, the average size of inclusions 14', 14" is minimized to less than 1 micron, more preferably less than about 0.5 micron, which results in a substantial quantity of fine inclusions 14', 14" in microstructures of weld metal according to this invention. This is achieved by having oxide nuclei that contain preferably greater than about 50 wt % of Zr, Ti, or mixtures thereof. Preferably, an adequate amount, and no more, of these fine inclusions 14', 14" are created to provide for sufficient nucleation of acicular ferrite 16', 16", grain boundary pinning, and weld pool deoxidation. Consistent with these objectives, the additions of Zr, Ti, and Al are limited to keep the overall weld metal inclusion content low and the average size small in order to maximize toughness. For example Zr is limited to 0.04 wt %, Ti is limited to 0.020 wt %, and Al is limited to 0.02 wt %.

Chemistry

Weld metals according to this invention comprise some or all of the following elements in about the wt % ranges shown:

TABLE I

| (Table I) Alloying Element | (Table I) Preferred Amount (wt %) | (Table I) More Preferred Amount (wt %) |
|---|---|---|
| Carbon (C) | 0.04 to 0.08 | 0.055 to 0.07 |
| Manganese (Mn) | 1.0 to 2.0 | 1.80 |
| Silicon (Si) | 0.2 to 0.7 | 0.5 |
| Sulfur (S) | less than 0.01 | less than 0.004 |
| Phosphorus (P) | less than 0.01 | less than 0.008 |
| Chromium (Cr) | up to 0.60 | 0.20 |
| Nickel (Ni) | 2.3 to 3.5 | 2.7 |
| Molybdenum (Mo) | 0.30 to 0.80 | 0.60 |
| Copper (Cu) | up to 0.60 | 0.20 |
| Aluminum (Al) | up to 0.03 | up to 0.008 |
| Titanium (Ti) | up to 0.02 | 0.01 |
| Zirconium (Zr) | up to 0.04 | 0.01 |
| Vanadium (V) | up to 0.040 | 0 |
| Boron (B) | up to 0.0012 | 0 |
| Oxygen (O) | 0.0175 to 0.0400 | 0.0200 to 0.0260 |
| Nitrogen (N) | less than 0.020 | less than 0.007 |
| Iron (Fe) | Balance | Balance |

Weld metals according to this invention comprise from about 0.04 wt % to about 0.08 wt % carbon, more preferably greater than about 0.05 wt % to about 0.075 wt % carbon, and even more preferably from about 0.055 wt % to about 0.07 wt % carbon. This intermediate carbon content, as compared to that of LCBF or martensitic weld metals, promotes the mixed microstructure of weld metals according to this invention. Zr, Ti, and O assist in producing the desired number, size, and chemistry of oxide inclusions in the microstructure. Zr is added as the primary oxide former of weld metals of this invention because of its high affinity for oxygen and its ability to create small inclusions. Titanium may also be added as an oxide former; however, its potency in producing small inclusions is less than that of Zr. During welding, Zr is preferentially oxidized at high temperatures and, due to the high driving force for its oxidation, creates many small oxide inclusion nuclei. Zr content is limited to 0.04 wt % to control the growth of the inclusions as well as to produce the desired inclusion content. Titanium, as an alloy addition, provides oxidation potential beyond a weld metal alloyed only with Zr. Ti-oxide is known to be beneficial in steel weld metals for the nucleation of acicular ferrite. It is believed by the inventors that Zr is also beneficial for the nucleation of acicular ferrite. In weld metals according to this invention, a sufficiently low volume percent of oxide inclusions is present to produce high toughness, but an adequate number of fine oxide inclusions are present to assist in the formation of a preferred volume percent of acicular ferrite (e.g., from about 5 vol % to about 45 vol %) and to perform a desirable grain boundary pinning effect.

Manganese, silicon, chromium, molybdenum, and copper are added in amounts sufficient to provide the requisite solid solution strengthening and the hardenability necessary to form a predominant amount of hard constituent in the microstructure, but all of these elements are limited in order to achieve the desired toughness in weld metals of this invention.

In addition to contributing to general hardenability, Si performs the function of deoxidation in the molten weld pool, and it provides desirable surface tension characteristics that increase weld pool fluidity. The enhanced fluidity helps the molten pool "wet" smoothly against the weld bevel sidewall. This minimizes stress concentrations at the weld toe and helps prevent weld defects. Because Si is a strong deoxidizer, it will be present as an element within many of the oxide inclusions. To maximize toughness by creating relatively small oxide inclusions, Si is limited to prevent a high driving force for inclusion growth. A key aspect of the Si additions of the present invention is concerned with temper resistance in the weld metal during multipass heating. Each successive weld bead tends to temper the lath martensite contained in the previous pass, resulting in coarser carbide particles and softening of the martensite. Si additions help resist this phenomena. By this mechanism, Si contributes to weld metal strength at levels beyond simple solid solution strengthening and hardenability enhancement.

Ni is added, primarily, to increase toughness, but its amount is limited to control cost and avoid coarse as-solidified grains. Ni is added to help provide the necessary toughness for girth welding of HSLA steel linepipe to produce pipelines suitable for cold weather service down to about −40° C. (−40° F.), or even as low as −60° C. (−76° F.).

In cases where higher strength is desired, V can be added for increased temper resistance and B can be added as a hardenability agent and strengthener.

Welding Methods

The chemistry of weld metals according to this invention is best suited for relatively low heat input welding. More particularly, this chemistry is designed to give the desired combination of strength and toughness when welded with heat inputs in the range of about 0.3 kJ/mm (7.6 kJ/inch) to about 2.5 kJ/mm (63 kJ/inch). More preferably, the upper limit of this heat input range is about 1.5 kJ/mm (38 kJ/inch). The 1.5 kJ/mm (38 kJ/inch) heat input limit is typical of the mechanized girth welding techniques available for field construction of high strength, large diameter pipelines. Such pipelines are typically greater in diameter than about 40.6 cm (16 inches). Wall thickness ranges from a lower bound of about 8 to 10 mm (0.3 in. to 0.4 in.) to an upper bound of about 30 mm (1.2 in.). More typically, 20 to 25 mm (0.8 to 1 in.) represents the upper bound of the thickness range for high strength pipelines.

Figure 2:
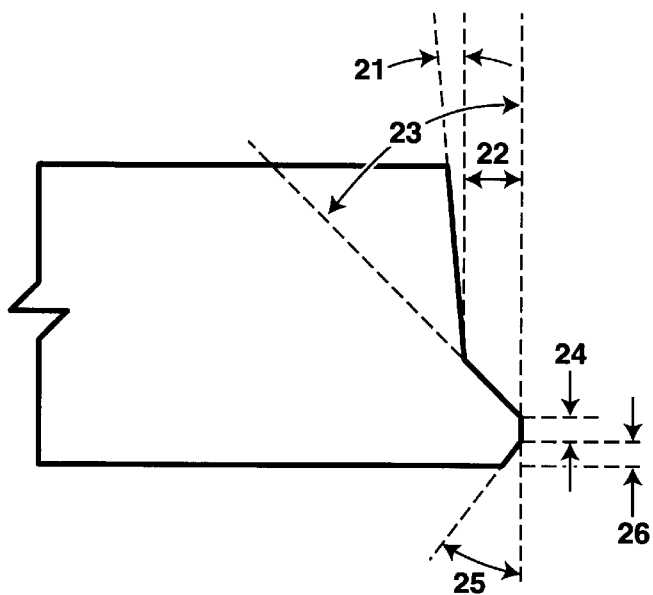
FIG. 2 (PRIOR ART) is an illustration of a CRC-type, narrow gap weld bevel.

Mechanized field girth welding is conducted with the linepipe held stationary; and, therefore, all-position welding is performed. Narrow gap weld bevels are often used to maximize productivity. One common narrow gap weld bevel is the CRC-type as shown in FIG. 2, in which angle 21 measures about 5°, angle 23 measures about 45°, angle 25 measures about 37.5°, distance 22 is about 0.330 cm (0.130 inches), distance 24 is about 0.127 cm (0.050 inches), and distance 26 is about 0.127 (0.050 inches). In order to produce small enough weld pools such that the molten metal will not fall out during application of the vertical and overhead segments, relatively low heat inputs are necessary. Another aspect favoring low heat inputs is that the arc and weld pool must be small enough to allow some manipulation inside the weld bevel. Therefore, for mechanized field girth welding, there are several factors that place natural upper limits on heat input and also favor the use of small diameter consumable wires, such as 0.9 mm (0.035 in.) and 1.2 mm (0.045 in). Because low heat inputs are common to pipeline girth welding, lack-of-fusion defects are a concern. Pulsing power supplies can be used to reduce the formation of lack-of-fusion defects, as is known to those skilled in the art. Pulsed GMAW (PGMAW) is a preferred welding technique of this invention.

Figure 3:
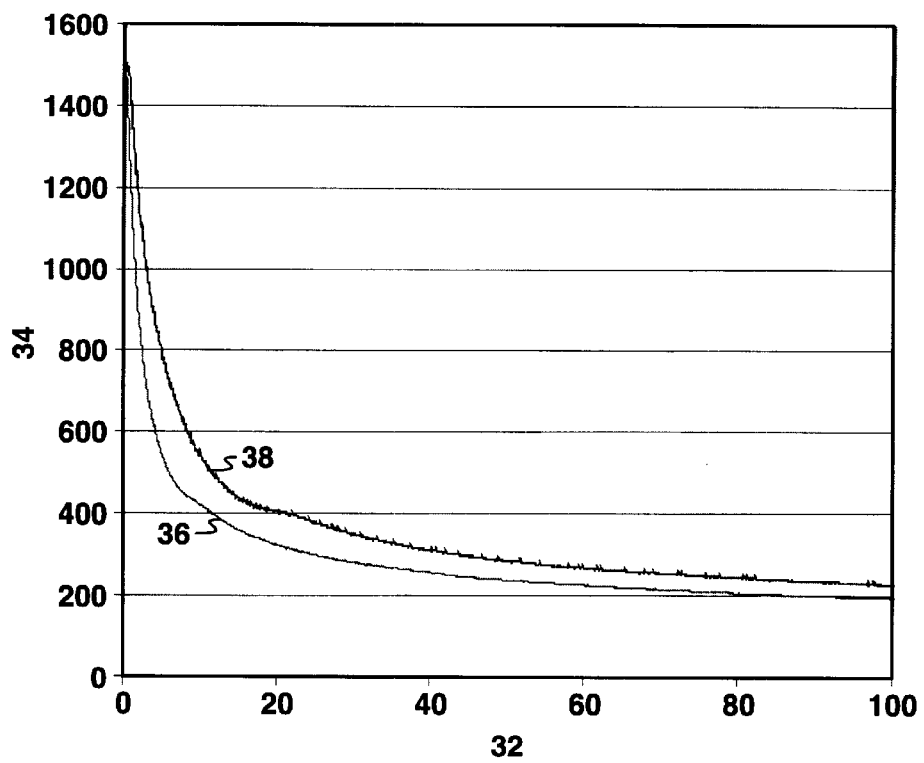
FIG. 3 is an illustration of cooling curves for welds made according to this invention.

The preferred welding techniques of this invention result in a characteristic range of weld metal cooling conditions. Examples of weld metal cooling curves for welds produced using the preferred techniques of this invention are shown in FIG. 3. More particularly, FIG. 3 shows cooling curves measured by plunging a thermocouple into the weld pool of a mechanized PGMAW weld made on 16 mm (0.63 inch) thick, 91 cm (36 inch) diameter HSLA steel linepipe using a CRC-type bevel and a preheat temperature of 100° C. (212° F.). In FIG. 3, axis 32 represents time in seconds, axis 34 represents temperature in degrees Celsius, curve 36 is a cooling curve for a weld made at a heat input of about 0.62 kJ/mm (15.8 kJ/inch), and curve 38 is a cooling curve for a weld made at a heat input of about 0.95 kJ/mm (24.1 kJ/inch). These curves correspond to cooling times between 800° C. (1472° F.) and 500° C. (932° F.) of about 3 to 7 seconds and cooling rates between these two temperatures of about 43 to 100° C./sec (77 to 180° F./sec). Differences in heat input, linepipe geometry or weld configuration that are within the scope of the preferred welding technique may produce somewhat faster or slower cooling rates than those illustrated.

The shielding gas composition for the preferred welding technique contains greater than about 50 vol % argon (Ar), and more preferably greater than 75 vol % Ar, with additions of carbon dioxide ($CO_2$), and/or oxygen, and/or helium. A preferred gas composition is a mixture of Ar and $CO_2$ comprising in the range of about 80 vol % to about 90 vol % Ar and about 10 vol % to about 20 vol % $CO_2$. An even more preferred gas composition includes helium (He) additions of up to about 25 vol %. The helium addition produces a more fluid weld pool, better wetting into the sidewall, and less "crowning" of the weld bead during pipeline girth welding. Crowning refers to a convex weld bead surface profile and this can be particularly pronounced in the overhead segments of a girth weld. In the case of a He-containing gas, a $CO_2$ content of at least about 5 vol % would be used with the remainder of the gas mixture being argon. Higher Ar and He contents are within the scope of the present invention.

The shielding gas composition provides an oxidizing potential that facilitates formation of the desired distribution of oxide inclusions. More particularly, the number and size of the oxide inclusions are limited by this shielding gas. Suffice it to say that the oxygen content of weld metals according to this invention can be varied from about 0.0175 wt % to about 0.400 wt % depending, primarily, on the CO2 or $O_2$ content of the shielding gas. More preferred toughnesses are achieved with oxygen in the range of about 0.0200 wt % to 0.0260 wt % and this requires a shielding gas with less than about 15 vol % $CO_2$, preferably about 5 vol % to about 10 vol % $CO_2$, or in the case that oxygen is used, less than about 5 vol % $O_2$ In some embodiments of this invention, oxygen content of the weld metal is in the range of about 0.0220 wt % to 0.0260 wt %. However, for less demanding applications and still within the scope of the current invention, cheaper shielding gases than those required to obtain the more preferred toughness can be used (i.e., less Ar and He, and higher $CO_2$ or oxygen).

Identification of Microstructural Components

Figure 4:
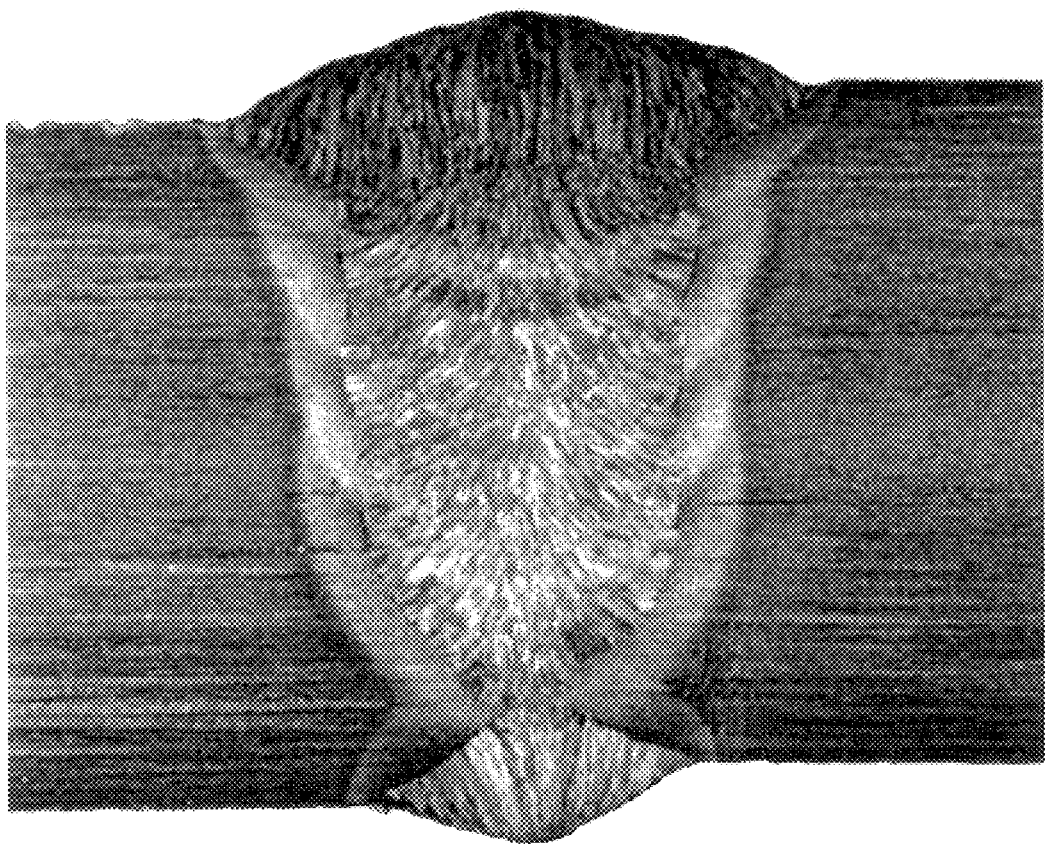
FIG. 4 is an optical macrograph of a multipass weld made according to this invention.

An optical macrograph of a multipass weld made according to this invention is shown in FIG. 4. As each weld bead solidifies, a plurality of grains nucleate epitaxially along the fusion line and grow with a columnar morphology toward the interior of the weld bead. As the weld cools, the microstructure within each columnar grain undergoes a transformation from austenite to a mixture of other phases and constituents. The final weld metal microstructure contains a relatively soft phase and one or more hard constituents. The soft phase is a toughness enhancing phase and the hard constituents provide high strength. Oxide inclusions are also present in the final weld metal. The soft phase is a type of acicular ferrite and is preferably present in amounts from about 5 to about 45 volume percent. The hard constituent(s) are the predominant component of the microstructure. Lath martensite, including auto-tempered lath martensite and tempered lath martensite, is preferably the predominant hard constituent, but other constituents such as degenerate upper bainite, lower bainite, and granular bainite may also be present.

FIG. 5A is a schematic illustration of lath martensite, showing auto-tempered cementite 51. The average lath width of the lath martensite in weld metals according to this invention is preferably less than about 0.3 micron. FIG. 5B is a schematic illustration of lower bainite, showing cementite 52 and bainitic ferrite 53. The average lath width of the lower bainite in weld metals according to this invention is preferably about 0.4 micron. FIG. 5C is a schematic illustration of degenerate upper bainite, showing bainitic ferrite 54 and martensite-austenite 55. The constituent 55 can also be martensite or austenite. The average lath width of the degenerate upper bainite in weld metals according to this invention is preferably about 0.6 micron. FIG. 5D is a schematic illustration of granular bainite, showing martensite-austenite constituent 56 and bainitic ferrite 57.

The average width of the bainitic ferrite in the granular bainite in weld metals according to this invention is preferably less than about 2 microns. FIG. 5E is a schematic illustration of a grain of acicular ferrite 58. The average width of an acicular ferrite grain in weld metals according to this invention is preferably about 0.7 micron to 1.5 microns.

Figure 7:
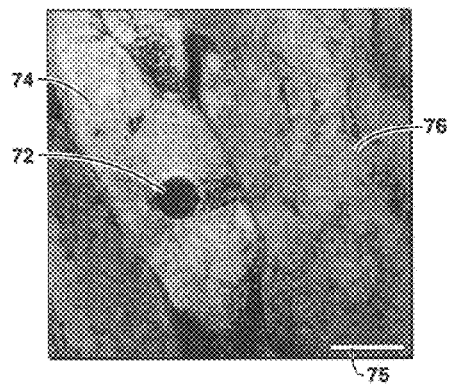
FIG. 7 is an image taken in a transmission electron microscope (TEM) showing an oxide inclusion and its related acicular ferrite grain in a weld metal according to this invention.
Figure 8:
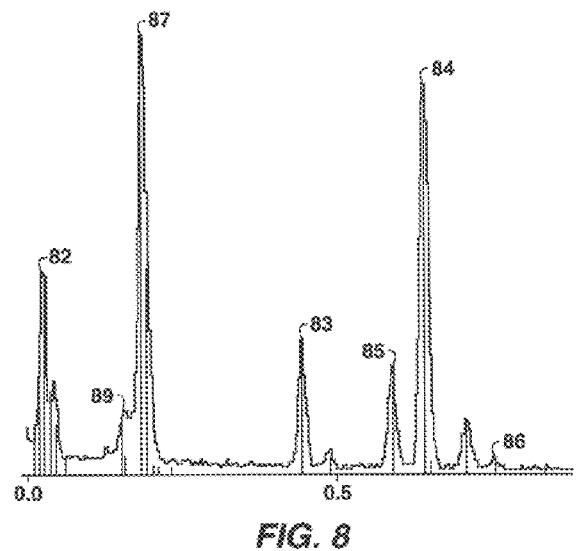
FIG. 8 is an energy dispersive spectroscopy (EDS) spectrum from the inclusion shown in FIG. 7.

The microstructure that develops within one weld metal austenite grain in a weld metal according to this invention is shown schematically in FIG. 1A and FIG. 1B. Typical images of this microstructure taken in the scanning electron microscope (SEM) are shown in FIG. 6A and FIG. 6B. FIG. 6A, in which scale 63 represents a distance of 5 microns, shows the presence of acicular ferrite 62 in a microstructure containing predominantly lath martensite 64. FIG. 6B, in which scale 67 represents a distance of 5 microns, shows the presence of acicular ferrite 68 in a microstructure containing predominantly lath martensite/degenerate upper bainite 66. The volume percent of lath martensite/degenerate upper bainite 66 in the microstructure shown in FIG. 6B is clearly higher than the volume percent of lath martensite 64 in the microstructure shown in FIG. 6A. Thus, a weld metal according to this invention having the microstructure shown in FIG. 6B would be stronger than a weld metal according to this invention having the microstructure shown in FIG. 6A. During the weld cooling cycle, austenite decomposition occurs first when acicular ferrite nucleates on small oxide inclusions that contain Zr or Ti or both. FIG. 7 is an image taken in the transmission electron microscope (TEM) showing the presence of lath martensite 76 and an oxide inclusion 72 with its related acicular ferrite grain 74. FIG. 8 is an energy dispersive spectroscopy (EDS) spectrum from oxide inclusion 72 shown in FIG. 7. FIG. 8 shows oxygen peak 82, titanium (Ti) peak 83, iron (Fe) peak 84, manganese peak 85, nickel peak 86, silicon peak 89, and zirconium (Zr) peak 87. The presence of Ti peak 83 and Zr peak 87 is clear. The aspect ratio of the acicular ferrite grains (which are plate shaped) is high enough that the acicular ferrite plates subdivide the austenite grains into smaller sub units. (See Glossary for definition of aspect ratio.)

Figure 9A:
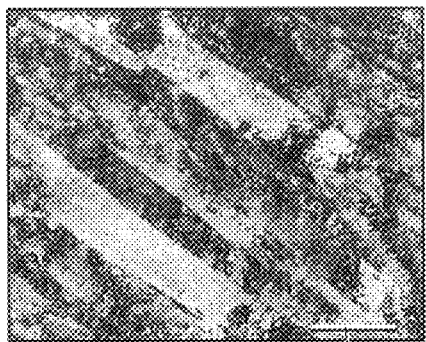
FIG. 9A is an image taken in a transmission electron microscope (TEM) showing lath martensite in a weld metal according to this invention.
Figure 9B:
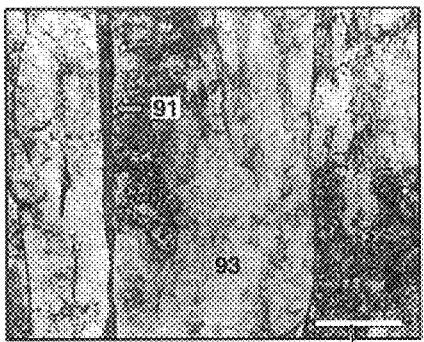
FIG. 9B is an image taken in a transmission electron microscope (TEM) showing degenerate upper bainite in a weld metal according to this invention.
Figure 9C:
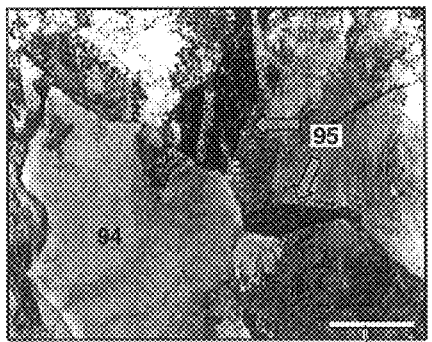
FIG. 9C is an image taken in a transmission electron microscope (TEM) showing granular bainite in a weld metal according to this invention.
Figure 9D:
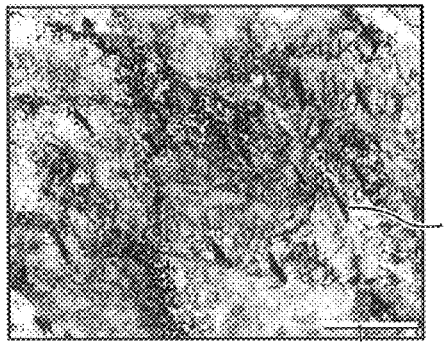
FIG. 9D is an image taken in a transmission electron microscope (TEM) showing lower bainite in a weld metal according to this invention.
Figure 10:
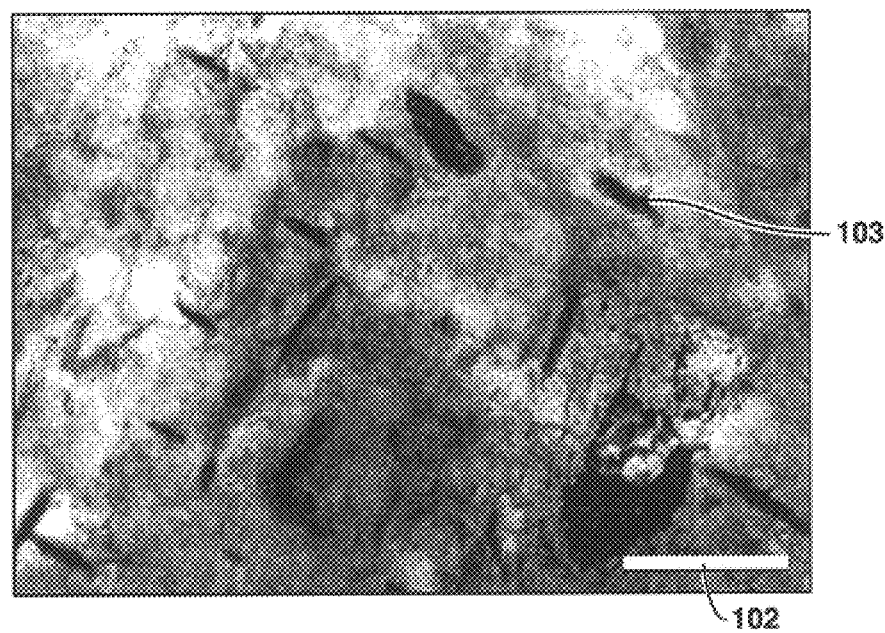
FIG. 10 is an image taken in a transmission electron microscope (TEM) showing auto-tempered lath martensite in a weld metal according to this invention.

At temperatures below those at which acicular ferrite nucleates, the austenite that remains between the acicular ferrite grains transforms into the hard constituents of the microstructure of weld metals according to this invention. Several TEM micrographs of the hard constituents are shown in FIG. 9A–FIG. 9D. The scale 92', 92", 92''', 92'''', for respectively, FIG. 9A, FIG. 9B, FIG. 9C, is 500 nm. FIG. 9A shows lath martensite. FIG. 9B shows degenerate upper bainite, containing martensite 91 and bainitic ferrite 93. FIG. 9C shows granular bainite, containing bainitic ferrite 94 and martensite-austenite 95. FIG. 9D shows lower bainite, containing carbide (cementite) 96. Lath martensite is often the predominant hard constituent. Due to the chemistry of weld metals according to this invention, the starting transformation temperature of the lath martensite is in the range of about 380° C. (716° F.) to about 430° C. (806° F.). This relatively high martensite start temperature (Ms transformation temperature) allows for some auto-tempering during the weld cooling cycle. Evidence of auto-tempering is shown in FIG. 10, a TEM micrograph with a scale 102 of 150 nm showing carbide (cementite) 103 present in auto-tempered lath martensite.

Preferably the transformation temperature of the acicular ferrite is high enough that significant carbon partitioning into the remaining austenite occurs, and this enrichment creates stronger hard constituents. Promotion of the dual phase nature of the microstructure enhances both strength and toughness. During experimental work undertaken by the inventors, the relative transformation temperature of different weld metals produced according to this invention was inferred by the aspect ratio and average thickness of the individual acicular ferrite grains. Lower aspect ratios and thicker grains are indicative of higher transformation temperatures.

An acicular ferrite morphology with a very high aspect ratio, e.g., greater than about 20:1, whereby the acicular ferrite grains extend entirely across the prior austenite grain, is avoided in a preferred microstructure for weld metals according to this invention. This needle-like morphology produces high strength, but inferior toughness, compared to a lower aspect ratio morphology whereby the acicular ferrite plates do not extend entirely across the prior austenite grain. The aspect ratio of acicular ferrite becomes higher as the alloy content is increased and/or the cooling rate is increased, and the transformation temperature is decreased. Once the Pcm (see Glossary) exceeds a value of approximately 0.295, the acicular ferrite becomes increasingly needle-like and the amount in the microstructure decreases to about 10 vol % or less. Once the Pcm exceeds a value of approximately 0.305, the volume fraction of acicular ferrite decreases to about 5 vol % or less. At these low levels of acicular ferrite, the microstructure loses its dual phase nature (soft phase plus hard constituents) and toughness is reduced. For lower strength microstructures of weld metals according to this invention, a larger volume percent of lower aspect ratio (say, about 5:1) acicular ferrite is preferably produced to effectively subdivide the prior austenite grains and provide superior low temperature toughness (see FIG. 1A). In this case, the relatively high volume percent of acicular ferrite produces strengths in the lower end of the range for the present invention.

Figure 11:
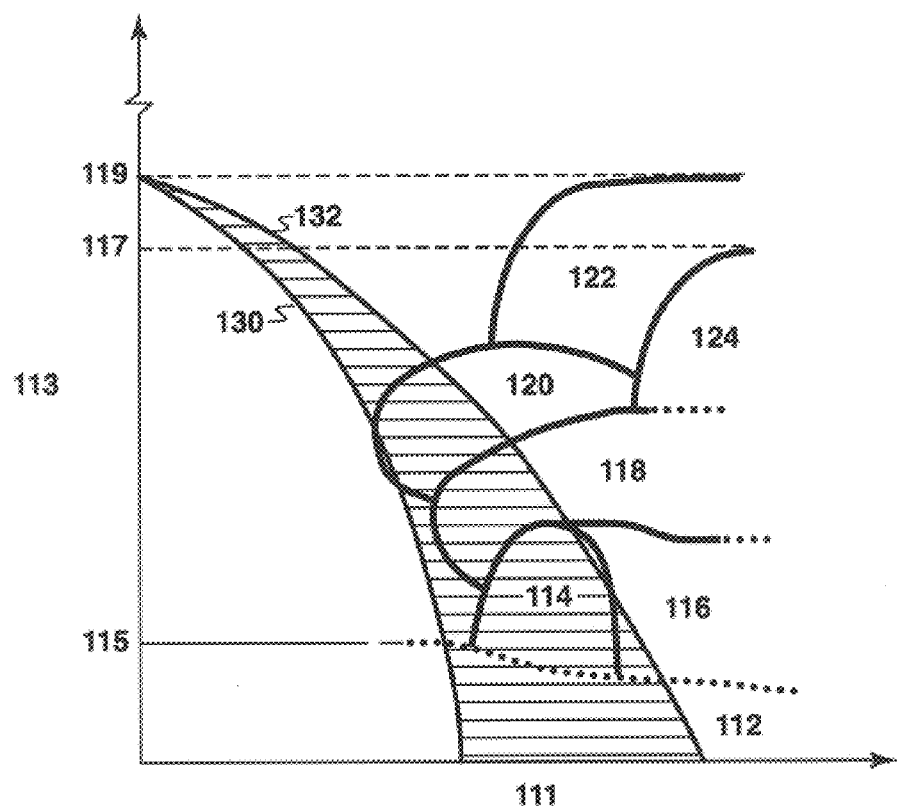
FIG. 11 is a schematic of a continuous cooling transformation (CCT) diagram for a weld metal microstructure produced according to this invention.

A schematic of a continuous cooling transformation (CCT) diagram for a weld metal microstructure produced according to this invention is shown in FIG. 11. In FIG. 11, axis 111 represents time and axis 113 represents temperature, with 115 representing the Ms transformation temperature, 117 representing the $Ar_1$ transformation temperature, and 119 representing the $Ar_3$ transformation temperature (see Glossary for definitions of Ms transformation temperature, $Ar_1$ transformation temperature, and $Ar_3$ transformation temperature). FIG. 11 also shows cooling curves 130 and 132 and regions of martensite 112, granular bainite 114, lower bainite 116, degenerate upper bainite 118, acicular ferrite 120, ferrite 122, and pearlite 124. Because of partitioning that occurs during solidification and subsequent transformation, it is difficult to describe a CCT diagram that represents all areas of a weld metal. In other words, from point-to-point in a weld metal, the chemistry will vary and the CCT will vary. FIG. 11 is intended as a general schematic.

The combined soft phase plus hard constituents design of a weld metal according to this invention provides a superior combination of strength and toughness. This microstructure may be referred to as acicular ferrite interspersed in martensite (AFIM). In this term, "martensite" is used to refer to what is typically a mixture of hard constituents. Lath martensite is often the predominant component of the hard constituent, however, non-martensitic constituents will also be present. The AFIM microstructure is distinctly different from the LCBF type weld metals because it contains other than bainitic products; and it is different from the traditional martensitic weld metals because it contains acicular ferrite.

Oxide Inclusions

The formation of acicular ferrite depends not only on weld metal chemistry and cooling rate (which in turn depend on a number of welding parameters including heat input, preheat, and base material thickness, etc.), but also on the type, size and number density of oxide inclusions in the weld metal. The use of inclusions to promote a certain morphology of acicular ferrite is an integral part of the weld metal microstructure according to this invention. Zirconium is used in the weld metal (and to a lesser degree Ti) to promote a fine dispersion of oxide inclusions and acicular ferrite nucleated at these inclusions. During experimental work, the inventors quantified the sizes and number densities of weld metal inclusions. Each weld that was analyzed for inclusion content was examined with a minimum of 12 TEM bright-field micrographs (frames) taken at a magnification of 6,300. The average oxide inclusion size and number densities ranged from about 250 nm to about 650 nm, and about $1.5 \times 10^{10}/m^2$ to about $10.5 \times 10^{10}/m^2$, respectively. In some embodiments, the average oxide inclusion size ranges from about 250 nm to about 550 nm.

The inventors observed that oxide inclusions larger than about 1 micron in diameter are not effective in promoting the formation of acicular ferrite. As a result, the weld metal chemistry and welding procedure for producing weld metals according to this invention are designed to minimize the formation of these coarse oxide inclusions. Additions of Zr, and to a lesser extent Ti, in the amounts specified in this invention are key in controlling inclusion size. The amounts of other strong deoxidizers, such as Al and Si, are controlled for this purpose as well. Furthermore, the amount of weld metal oxygen is controlled to less than about 0.0400 wt % by choice of shielding gas and welding heat input to help restrict oxide inclusion growth. The mean diameter of the preferred oxide inclusions ranges from about 250 nm to about 500 nm.

Figure 12:
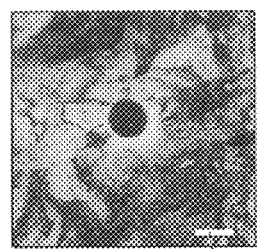
FIG. 12 is a low magnification image taken in a transmission electron microscope (TEM) showing an inclusion in a weld metal according to this invention.
Figure 13:
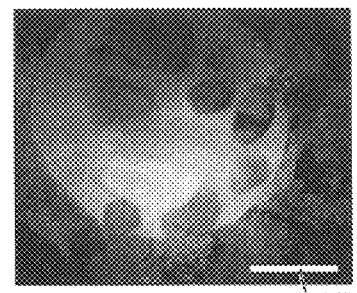
FIG. 13 is a high magnification image taken in a TEM showing an inclusion in a weld metal according to this invention.
Figure 14A:
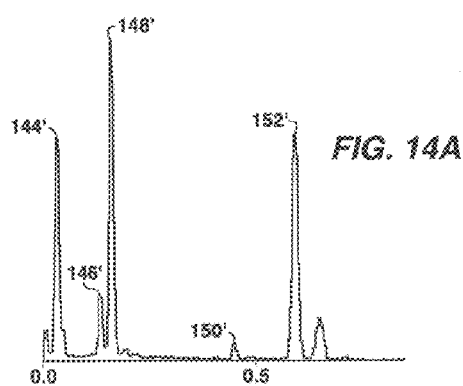
FIG. 14A is an energy dispersive spectroscopy (EDS) spectrum from the inclusion shown in FIG. 12.
Figure 14B:
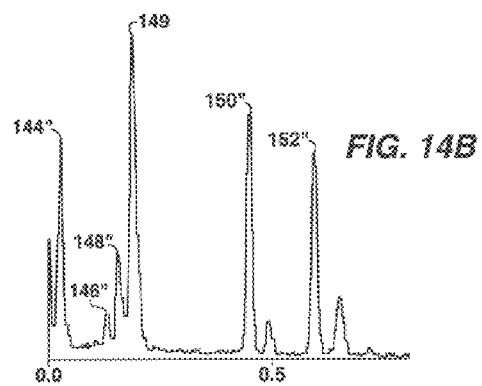
FIG. 14B is an energy dispersive spectroscopy (EDS) spectrum from the cluster of particles inside the inclusion shown in FIG. 13.

The chemistries of the preferred inclusions in weld metals according to this invention are oxides that are nucleated, primarily as Zr oxides, and to a lesser extent Ti oxides. For a weld metal oxygen content of about 0.0200 wt % to about 0.0400 wt %, it has been determined by the inventors that Zr (and to a lesser degree Ti) added to the weld metal via the weld consumable wire, results in an increase in number density, and a decrease in size, of the oxide inclusions in the weld metal as compared to the case where Zr and/or Ti is not added. High resolution TEM/STEM analyses have identified the unique structure of Zr-containing oxide inclusions. STEM is an acronym for scanning transmission electron microscope. FIG. 12, which has a scale 141 of 900 nm, is a low magnification image of an oxide inclusion. FIG. 13, which has a scale 143 of 300 nm, is a higher magnification image of another inclusion. FIG. 14A is an EDS spectrum from the inclusion shown in FIG. 12 and shows oxygen peak 144', aluminum peak 146', silicon peak 148', titanium peak 150', and manganese peak 152'. FIG. 14B is an EDS spectrum from the cluster of particles inside the inclusion shown in FIG. 13 and shows oxygen peak 144", aluminum peak 146", silicon peak 148", zirconium peak 149, titanium peak 150", and manganese peak 152".

When Zr is added to the weld metal via the welding consumable wire, most of the weld metal oxide inclusions have a core consisting of a cluster of small, oxide particles that preferably comprise greater than about 50 wt % Zr. Each individual particle is preferably less than about 100 nm in diameter. Often, the thus Zr-rich core is enveloped by an outer layer (shell) that comprises oxides of predominantly Mn, Al, Si, or mixtures thereof. The mean diameter of the final oxide inclusions that exist in the solidified weld metal (core plus outer layer) is about 250 to 500 nm. The inventors believe that Zr promotes the formation of acicular ferrite by causing the formation of many small inclusions that act as heterogeneous nucleation sites. A preferred weld metal according to this invention contains acicular ferrite that has been nucleated from oxide inclusions comprising a core of one or more oxide particles. In one embodiment, the core has a combined Zr and Ti content of greater than about 50 wt %. In another embodiment, the core has a Zr content of greater than about 50 wt %.

In summary, the inventors have discovered that Zr is effective in creating extremely small individual particles in the weld metal. These particles nucleate profusely and uniformly and control the final size and dispersion of oxide inclusions in the weld metal. Zr is found to be more potent than Ti in creating small weld metal inclusions. It is reported in industry publications that Ti is a strong nucleator of acicular ferrite. In the current invention, Zr has been found to act in the same beneficial role. Therefore, in a preferred chemistry according to this invention, both Zr and Ti can be added.

Creating Superior Weld Metal Toughness

The AFIM microstructure is designed to produce both a low ductile-to-brittle transition temperature (DBTT) and a high upper shelf toughness as measured by either the Charpy V-notch test or a fracture mechanics test such as the CTOD or J-integral test. As known to those skilled in the art, the DBTT gives an indication of cleavage resistance whereas upper shelf toughness is related to ductile fracture resistance (i.e., fracture that proceeds by microvoid coalescence). The superior ductile and brittle fracture resistance of the AFIM microstructure can be attributed to several engineered aspects of the weld metal microstructure.

Carbon Content: The relatively low carbon content of weld metals according to this invention promotes a hard constituent (often lath martensite) with inherently good ductility and toughness. The carbon content is a significant factor in controlling martensite start transformation temperature, auto-tempering, the degree of tetragonality, and the dislocation density. These factors are the primary contributors to the toughness properties. The relatively low carbon content also limits the number and size of the intra-lath cementite particles that form in lath martensite either during auto-tempering in the as-deposited condition or upon reheating when subsequent weld passes are applied.

In the case of the bainites, the lower carbon content limits the number and size of the inter and intra-lath carbides (cementite or $Fe_3C$). Creating smaller carbide particles enhances cleavage fracture resistance. Furthermore, the lower carbon content substantially excludes the formation of embrittling "classical upper bainite" with its characteristic, continuous carbide films at the lath boundaries. Classical upper bainite generates very poor toughness as is well known to those skilled in the art. The relatively low carbon weld metals of the present invention create a type of upper bainite known as degenerate upper bainite (DUB), wherein the interlath films are martensite or martensite-austenite, and not carbide. The DUB that is present in some weld metals according to this invention produces far superior ductility and toughness compared to the classical upper bainite that occurs in weld metals with higher carbon contents.

Grain Size: As is known to those skilled in the art, a small grain size is beneficial for both ductile and brittle fracture resistance. In the AFIM microstructure, a small grain size is created, primarily, by selection of (1) the welding procedure, and thus, the cooling rate, (2) the weld metal chemistry, and (3) the shielding gas composition. The low welding heat input promotes relatively rapid heating and cooling rates. This limits the time at high temperature and minimizes the driving force available for grain growth. The fast cooling also promotes lower transformation temperatures and a more refined microstructure. The chemical composition (i.e., hardenability) and the inclusion content (i.e., acicular ferrite nucleation sites) are preferably designed so that the following products and their derivatives are avoided: grain boundary Widmanstätten or blocky ferrite, intragranular polygonal (blocky) ferrite, coarse ferrite with aligned second phase, and pearlite. The effective grain size of the preferred microstructure is significantly smaller than the transformation products just listed. The fine distribution of small oxide inclusions acts to pin grain boundaries in the weld metal at high temperatures. This is very important at locations close behind the traveling solidification front. At these high temperatures the columnar weld metal grains attempt to grow and the inclusions exert a "drag" effect, as known to those skilled in the art of metallurgy, that slows grain boundary movement.

Acicular Ferrite: The toughness of the AFIM microstructure is enhanced by the presence of acicular ferrite due to the inherent high toughness properties of this fine grained ferrite. Additionally, the morphology of the acicular ferrite acts to divide each austenite grain into smaller sub units which is analogous to a reduction in grain size.

Carbide Distribution: Because carbide particles can crack and cause cleavage initiation, the weld chemistry and welding procedure are designed to create a preferred microstructure that limits the amount and size of these carbides and in particular avoids continuous, interlath carbide films. The majority of the cementite that is present in the preferred microstructure is present as second phase particles within the hard constituent. These second phase particles form at temperatures at which carbon diffusion is somewhat limited; and, therefore, the individual particles are small. FIG. 10 shows cementite particles 103 that have precipitated inside martensite laths during auto-tempering.

Oxide Inclusions: According to this invention, a sufficient number of small oxide inclusions are created to (1) nucleate a critical volume percent of acicular ferrite, and (2) to induce the grain boundary pinning effect mentioned above. The inclusions that are created for these purposes are sufficiently small that they are not effective cleavage initiation sites. By creating small oxide inclusions that are finely distributed, the beneficial effects of the inclusions on weld metal microstructure, as described above, are maximized while minimizing any negative effect on both the ductile and cleavage fracture resistance.

Figure 15:
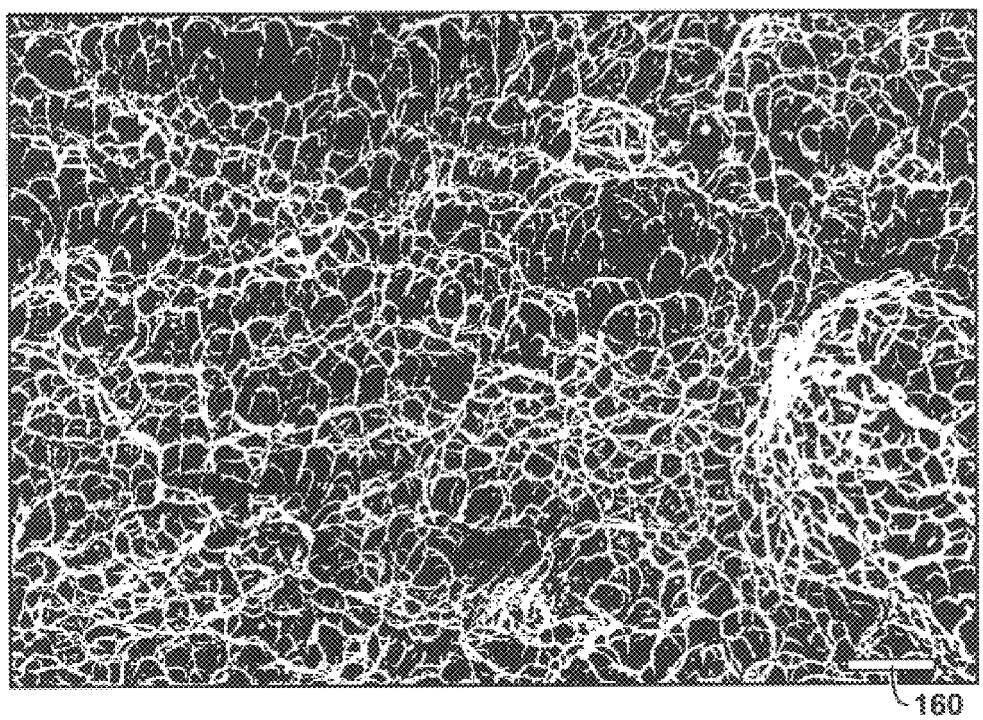
FIG. 15 is a fractograph taken in the scanning electron microscope (SEM) of the fracture surface of a Charpy V-notch specimen taken from a weld metal according to this invention.
Figure 16:
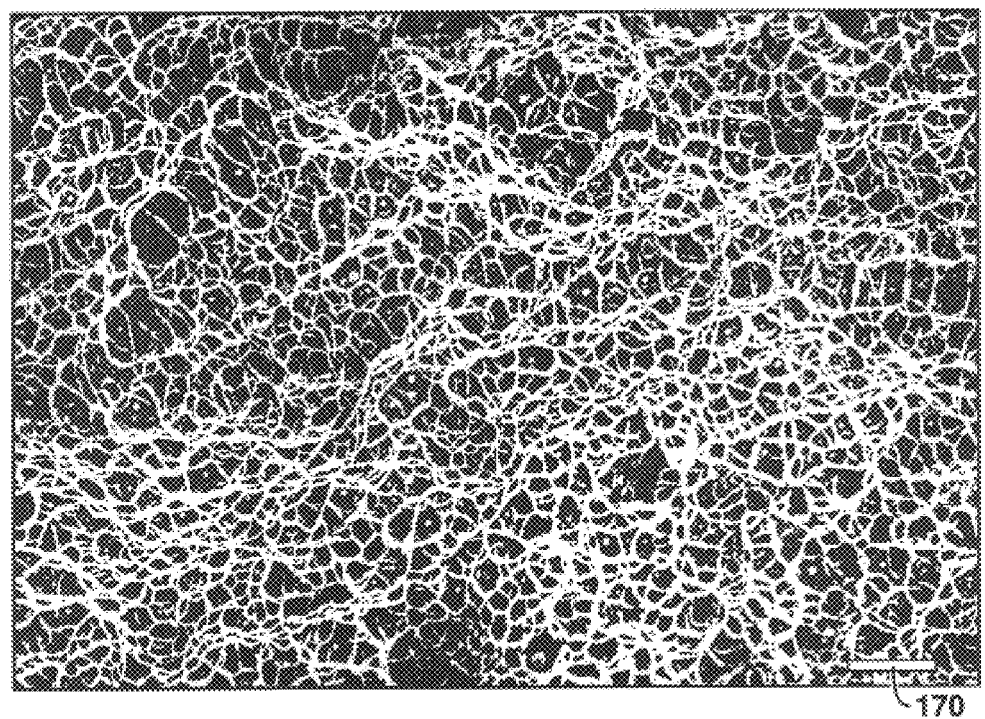
FIG. 16 is a fractograph taken in the scanning electron microscope (SEM) of the fracture surface of a CTOD specimen taken from a weld metal according to this invention.

Even at temperatures as low as −80° C. (−112° F.), the AFIM microstructure is capable of producing ductile fracture in the Charpy V-notch test. This is demonstrated in FIG. 15, which is an SEM fractograph (having a scale 160 of 10 microns) of the fracture surface of a Charpy V-notch specimen that was taken from a weld metal produced according to the current invention. The specimen of FIG. 15 was from a 16 mm wall thickness linepipe weld and the test temperature was −80° C. (−112° F.). The image of FIG. 15 was taken 0.5 mm from the notch tip. Another image (having a scale 170 of 10 microns) from the near notch tip region of a fracture toughness specimen (used for measuring CTOD or $J_{IC}$) tested at −80° C. (−112° F.) is shown in FIG. 16. The specimen was a B×2B geometry test from a 16 mm wall thickness linepipe weld, where B is the thickness and 2B is the width of the specimen, as will be familiar to those skilled in the art. With respect to ductile fracture, the smallness of the inclusions and their fine dispersion cause the matrix to undergo much deformation in order to link the microvoids and this creates good ductile fracture resistance.

Relationship Between Strength and Toughness

As is known to those skilled in the art of steel metallurgy, ferritic structural steels typically display an inverse relationship between strength and toughness. Depending on the particular steel, this relationship may be true for upper shelf toughness, or it may be true for the ductile-to-brittle transition temperature (DBTT), or it may be true for both of these toughness parameters. For the weld metals of the current invention, the strength-toughness inverse relationship is generally true for the upper shelf, but it does not necessarily hold true for the DBTT. The lower strength weld metals produced according to this invention tend to generate the highest upper shelf toughnesses. The higher strength weld metals tend to generate upper shelf toughnesses that are on the lower end of the spectrum. With respect to DBTT, it is possible to produce a strong microstructure (e.g., on the order of about 900 MPa to 931 MPa (130 to 135 ksi) yield strength) that is dominated by lath martensite and which generates a DBTT as low as −80° C. (−112° F.). This demonstrates one of the desirable characteristics of low carbon, lath martensite particularly if some auto-tempering or multipass weld-related tempering has occurred. Additionally, the small volume percent of acicular ferrite with the higher aspect ratio provides effective refinement of prior austenite grains.

Table II, which is provided after the Abstract, provides some guidance as to the relations between strength, toughness, chemistry, microstructure, and welding conditions according to the current invention. In general, the weld metal chemistries that are lower in alloy content (lower Pcm) tend to produce less of the hard constituents and more acicular ferrite, and this creates lower strength, but higher upper shelf toughness. On the other hand, the weld metal chemistries that contain a higher alloy content (higher Pcm) tend to produce more of the hard constituents and less acicular ferrite, and this creates higher strength, but the upper shelf toughness is typically on the lower end of the spectrum. With regard to welding conditions, higher heat inputs tend to create slower cooling rates and this favors more acicular ferrite, lower strength, and higher upper shelf toughness. Likewise, lower heat inputs tend to create faster cooling rates, less acicular ferrite (being replaced by more hard constituents), higher strength, but an upper shelf toughness that is on the lower end of the spectrum.

Preheat and Hydrogen Cracking Control

Hydrogen cracking is a problem often associated with the welding of high strength steels. Weld metals produced according to this invention are capable of producing yield strengths of up to about 931 MPa (135 ksi). Good hydrogen cracking resistance in these weld metals is accomplished by limiting the carbon content and by including a minor volume percent of acicular ferrite in the microstructure. The relatively low carbon, hard constituent (often lath martensite) when mixed with acicular ferrite provides superior cracking resistance as compared to traditional martensitic weld metals that contain more than about 0.08 wt. percent carbon. Furthermore, the Zr-containing oxide inclusions provide strong hydrogen traps in the weld metal, thus restricting the amount of available hydrogen for cracking. The cracking resistance of the weld metals created by the current invention may, for certain cases, be slightly inferior to the LCBF weld metals, but there are other beneficial tradeoffs considering the intended application of welding high strength steels. The strength potential of weld metals produced according to this invention is greater than for the LCBF weld metals because of the higher carbon content, the presence of lath martensite in the microstructure, and a lower welding heat input. Therefore, the weld metals of the current invention are better suited for welding steels with yield strengths above about 100 ksi (690 MPa).

Using a preheat of about 50° C. (122° F.) and a welding procedure that generates less than about 5 ml of diffusible hydrogen per 100 g of deposited weld metal, crack free welds can be produced using even the strongest of the weld metals produced according to this invention. However, for the most reliable application of the current invention, welding is conducted with preheats of at about 100° C. (212° F.), but not greater than about 150° C. (302° F.).

EXAMPLES

Associated with the current invention, numerous welds were made using experimental wires, various shielding gases, and different welding procedures. The wire chemistries are listed in Table II, which is provided after the Abstract. Some of the welds were made on 20 mm thick plate in the flat (1G) position. Other welds were made on 16 mm thick, 30–36 inch (762 –914 mm) diameter pipe. The nominal yield and ultimate strengths of all the base materials used were 120 ksi and 135 ksi, respectively. Welding was performed with the pipe stationary and the pipe axis horizontal (5G position).

All welds were produced using the PGMAW process. The weld preparation was a CRC bevel, which is shown in FIG. 2. The shielding gases used were $Ar/CO_2$ mixtures and $Ar/He/CO_2$ mixtures. The root and hot passes of all welds were made with a heat input of 0.3–0.5 kJ/mm. A heat input of about 0.5–1 kJ/mm was used for the fill and cap passes of all welds. The weld metal chemistries produced are listed in Table IV, which is provided after the Abstract. Additional welding procedure details are listed in Table V and Table VI, which are provided after the Abstract. A macro photograph of a typical polished and etched weld cross section is shown in FIG. 4.

Various mechanical tests were performed on each weld. All-weld-metal subsized tensile specimens with a gage diameter of 0.25" were machined such that the fill passes were sampled in the gage section (as opposed to sampling the root, hot, or cap passes). The Charpy V-notch specimens sampled the mid-thickness of the weld, including both the hot pass as well as most of the fill passes. Fifteen Charpy specimens were tested from each weld to characterize the Charpy transition curve. Each set of transition curve data (energy versus temperature) was statistically curve fitted using a hyperbolic tangent model and the non-linear regression routine of Statistical Analysis Software (SAS). The ductile-to-brittle transition temperature (DBTT) was that temperature denoting the point on the curve halfway between the upper and lower shelves.

Fracture mechanics tests were performed using full-thickness B×2B specimens with a through thickness notch orientation. The fatigue pre-cracks were located along the weld metal centerline. CTOD tests were performed on Welds A–H. Using the same method as for the Charpy results, a transition curve was fit to the CTOD data to determine the upper shelf CTOD and the CTOD DBTT. J-integral tests were performed on Welds L-FF using the same specimen geometry as for CTOD testing. To enable the measurement of a valid $J_{1C}$, crack growth was monitored during testing by the unloading compliance method. The J value reported in Table VIII, which is provided after the Abstract, is the lowest of at least three specimens tested at −20° C. A total of fourteen J-integral tests including tests at lower temperatures were performed to characterize the ductile-to-brittle transition behavior of each weld metal. The number of J-integral tests at various temperatures was, however, insufficient to statistically fit a transition curve; therefore, the J-integral DBTT was estimated by visual examination of a graph of the test data. Although determined visually, the J-integral DBTT's were estimated using the same philosophy (curve midpoint) as mentioned for the Charpy and CTOD transition curves.

The microstructure of each weld was characterized by scanning electron microscopy (SEM) and transmission electron microscopy (TEM). The non-metallic inclusions were also characterized in the TEM.

Example Microstructures

The proportions of the microstructural constituents in the example welds varied depending on weld metal chemistry, cooling rate, and shielding gas composition. In particular, the key components acicular ferrite and "hard constituent" were systematically varied and the proportions created cover the ranges in the AFIM microstructure as defined by this invention. Generally, as the weld metal alloy content increases and the weld cooling rate increases, a lower volume fraction of acicular ferrite was formed (see Table II, which is provided after the Abstract), this component being replaced by "hard constituent". The nature of the hard constituent also varied with chemistry and cooling rate. Several examples of AFIM microstructures with different characteristics are described below.

Figure 17A:
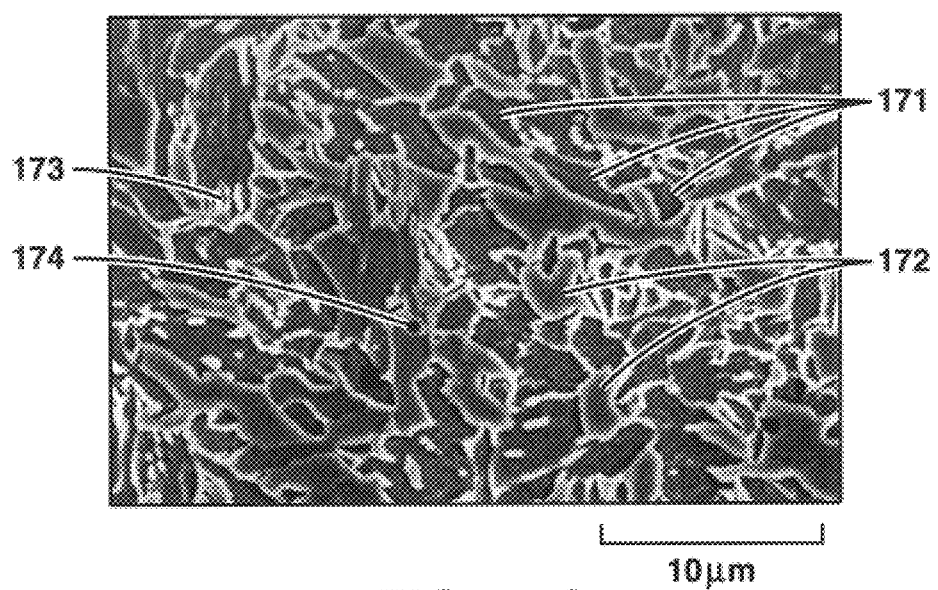
FIG. 17A is an image taken in the SEM of example weld A, an AFIM weld metal containing 36 vol. % acicular ferrite.
Figure 17B:
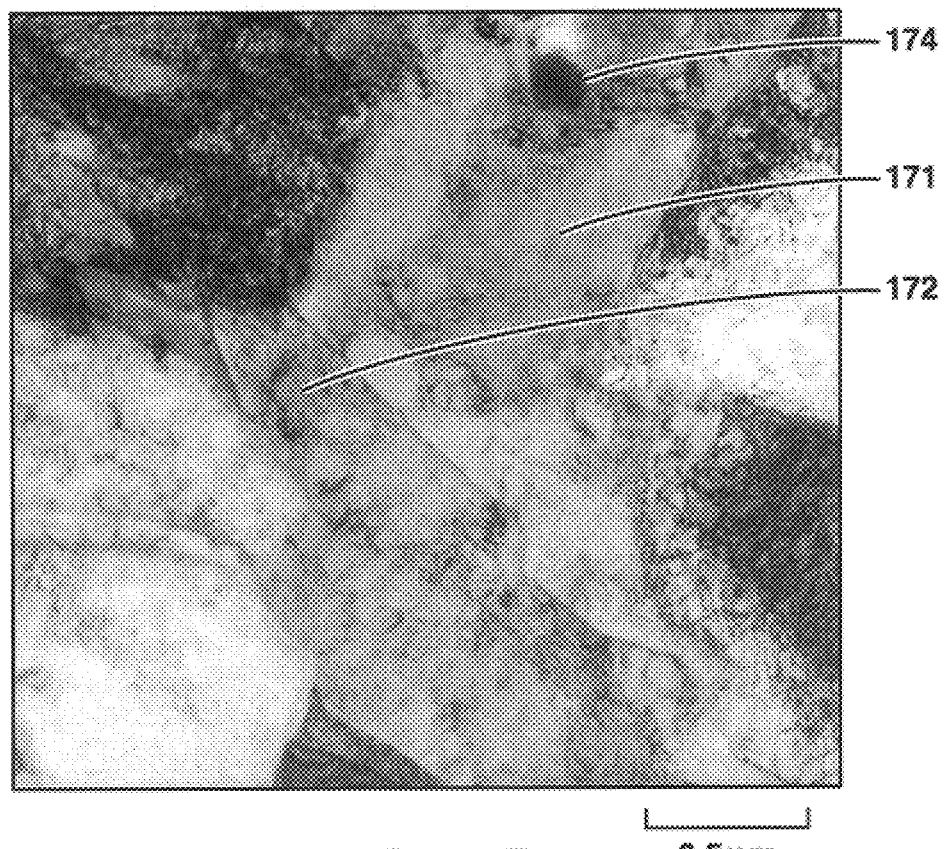
FIG. 17B is an image taken in the TEM of example weld A, an AFIM weld metal containing 36 vol. % acicular ferrite.

Weld A, with a weld metal Pcm of 0.241, was the lowest alloy content tested. The procedure used to make this weld (as well as Welds B–H) consisted of a heat input of 0.87 kJ/mm and an interpass temperature of between 175° C. and 200° C. These parameters produced a slower cooling rate than for the other welds. The combination of a slower cooling rate and lower hardenability produced an AFIM microstructure with a relatively high volume fraction of acicular ferrite. SEM, FIG. 17A, and TEM, FIG. 17B, micrographs of the microstructure of this weld are provided. The volume fraction of acicular ferrite 171 is 36%, and the hard constituents present are lath martensite 172 and degenerate upper bainite 173. Mn- and Si-rich oxide inclusions 174 are also seen in the micrographs of FIG. 17A and FIG. 17B. The average acicular ferrite 171 aspect ratio, as observed in the plane of the SEM sample, is about 3:1. This relatively blocky acicular ferrite 171 is characteristic of a higher transformation temperature within the range produced by AFIM weld metals.

Figure 18A:
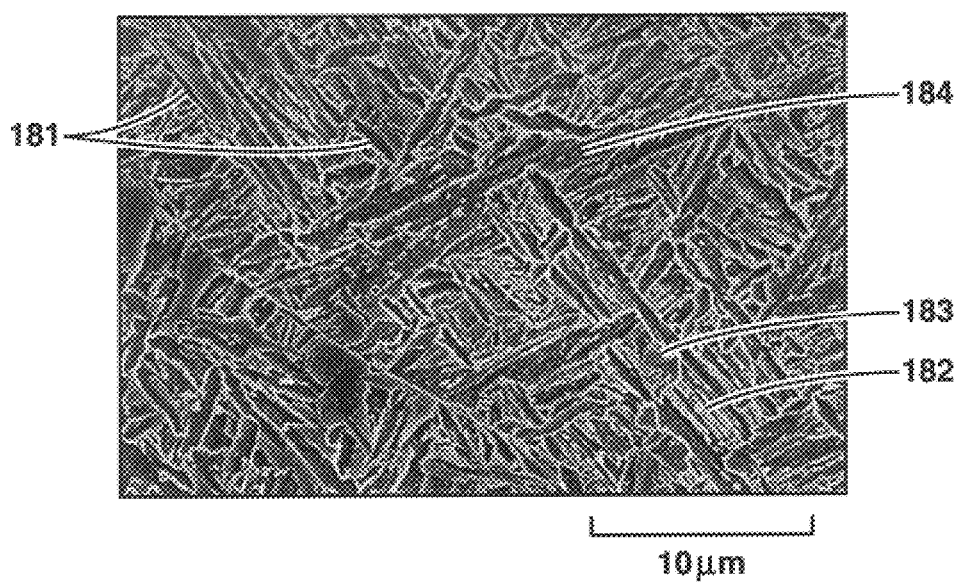
FIG. 18A is an image taken in the SEM of example weld M, an AFIM weld metal containing 14 vol. % acicular ferrite.
Figure 18B:
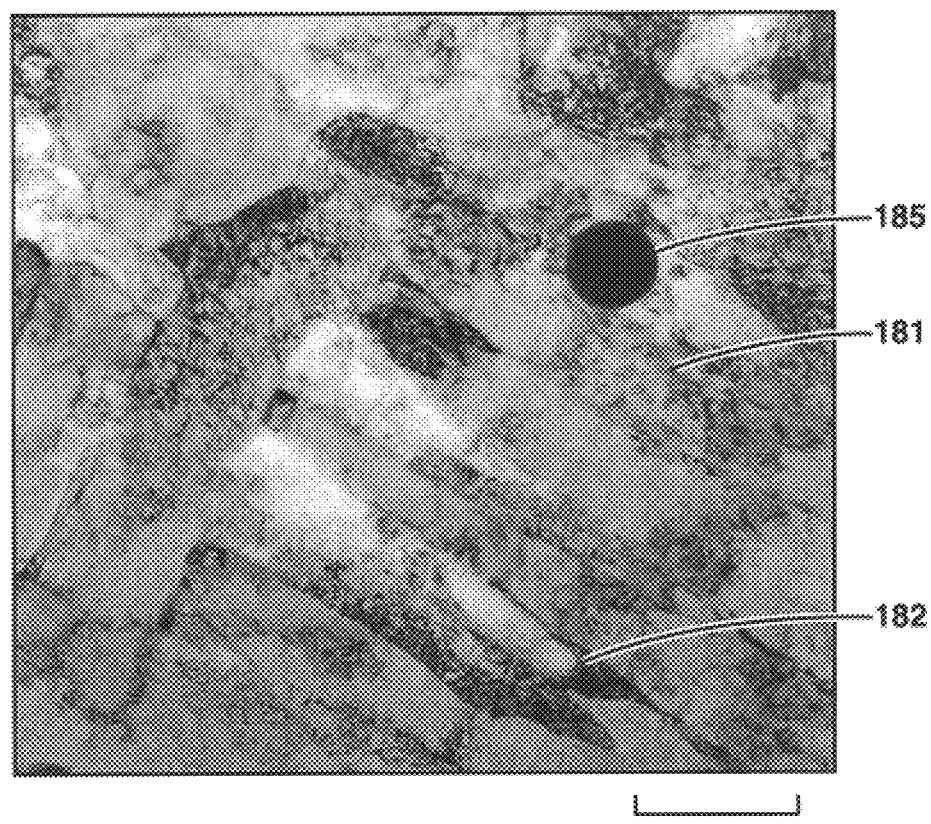
FIG. 18B is an image taken in the TEM of example weld M, an AFIM weld metal containing 14 vol. % acicular ferrite.

Weld M is characteristic of an AFIM microstructure made with a somewhat higher alloy content (Pcm of 0.280) and faster cooling rate than Weld A. The cooling rate was faster than for Weld A because the average heat input per pass was 0.68 kJ/mm and the interpass temperature was controlled within 100° C. to 125° C. The higher hardenability of this weld metal chemistry compared to Weld A and the faster cooling rate resulted in a lower volume fraction of acicular ferrite. SEM, FIG. 18A, and TEM, FIG. 18B, micrographs of this weld are provided. The acicular ferrite 181 volume fraction of Weld M is 14% and the average aspect ratio of the acicular ferrite 181 is 13:1. The higher aspect ratio is characteristic of an acicular ferrite that transformed at lower temperatures (compared to Weld A). In order of decreasing prevalence, the hard constituent consisted of degenerate upper bainite 182, lath martensite 183, and lower bainite 184. Zr-Ti rich oxide inclusion 185 is seen in FIG. 18B.

Figure 19A:
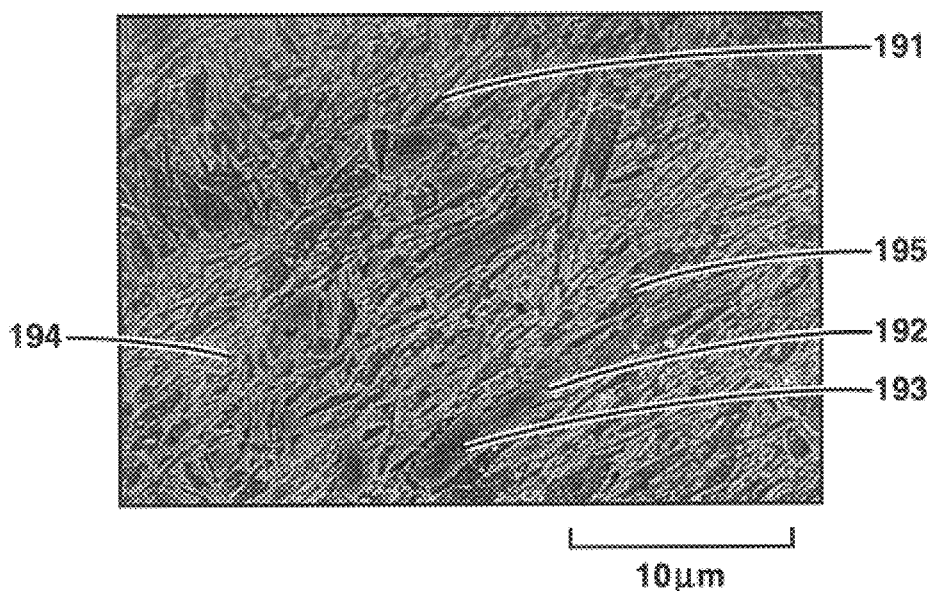
FIG. 19A is an image taken in the SEM of example weld S, an AFIM weld metal containing 6 vol. % acicular ferrite.
Figure 19B:
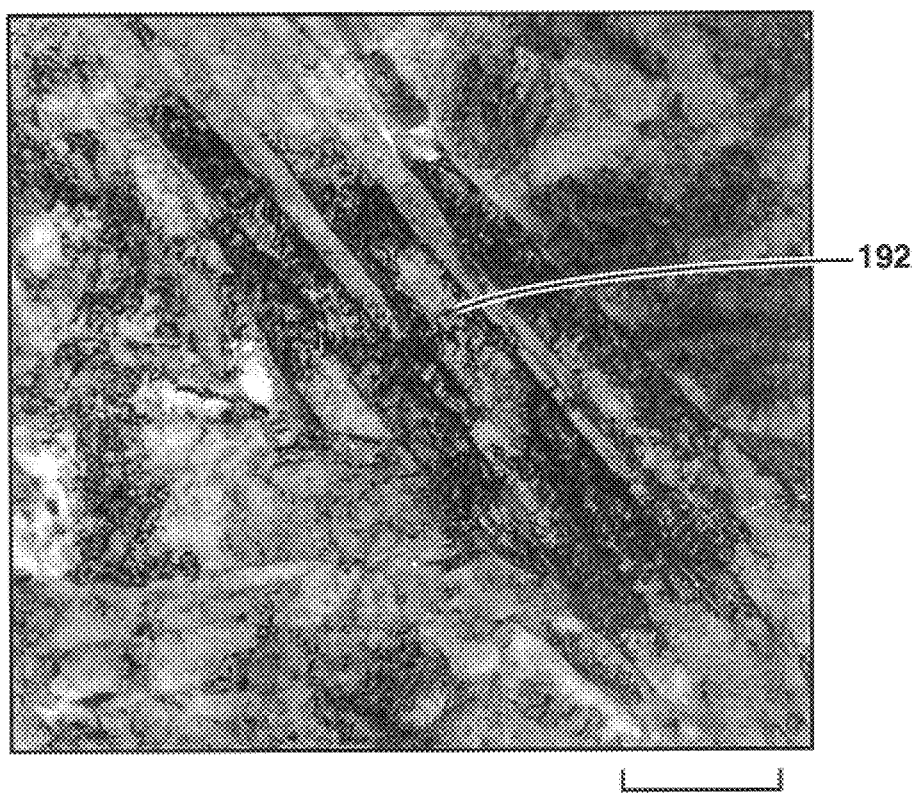
FIG. 19B is an image taken in the TEM of example weld S, an AFIM weld metal containing 6 vol. % acicular ferrite.

Weld S, with a weld metal Pcm of 0.304, was the highest alloy content that produced an AFIM microstructure. This example contained a volume fraction of acicular ferrite close to the minimum for AFIM as defined by this invention. The cooling rate of Weld S was similar to that of Weld M. SEM, FIG. 19A, and TEM, FIG. 19B, micrographs of Weld S are provided. Only 6% acicular ferrite 191 is formed and the average aspect ratio of the acicular ferrite 191 is 17:1. The acicular ferrite 191 in Weld S is still sufficient to subdivide the prior austenite grains and provide the microstructural refinement that is an important toughness enhancing characteristic of AFIM weld metals. In order of decreasing prevalence, the hard constituents formed in Weld S are lath martensite 192, lower bainite 193, degenerate upper bainite 194, and tempered martensite 195. The higher hardenability of Weld S results in the formation of a greater proportion of martensite than for Welds M or A.

Figure 20A:
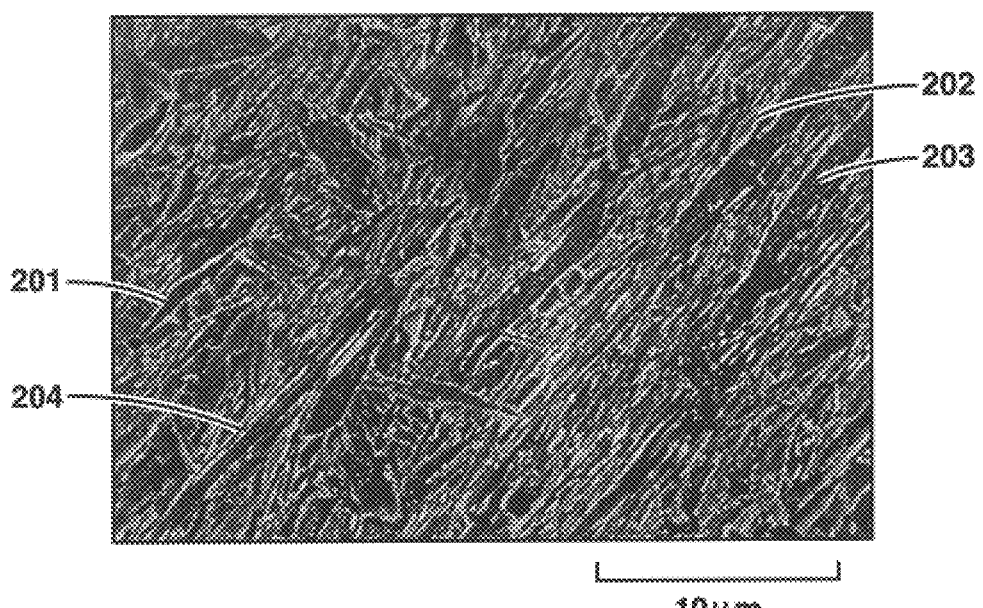
FIG. 20A is an image taken in the SEM of example weld T, a weld metal containing 4 vol. % acicular ferrite. Example weld T is not an AFIM weld metal as defined in this invention.
Figure 20B:
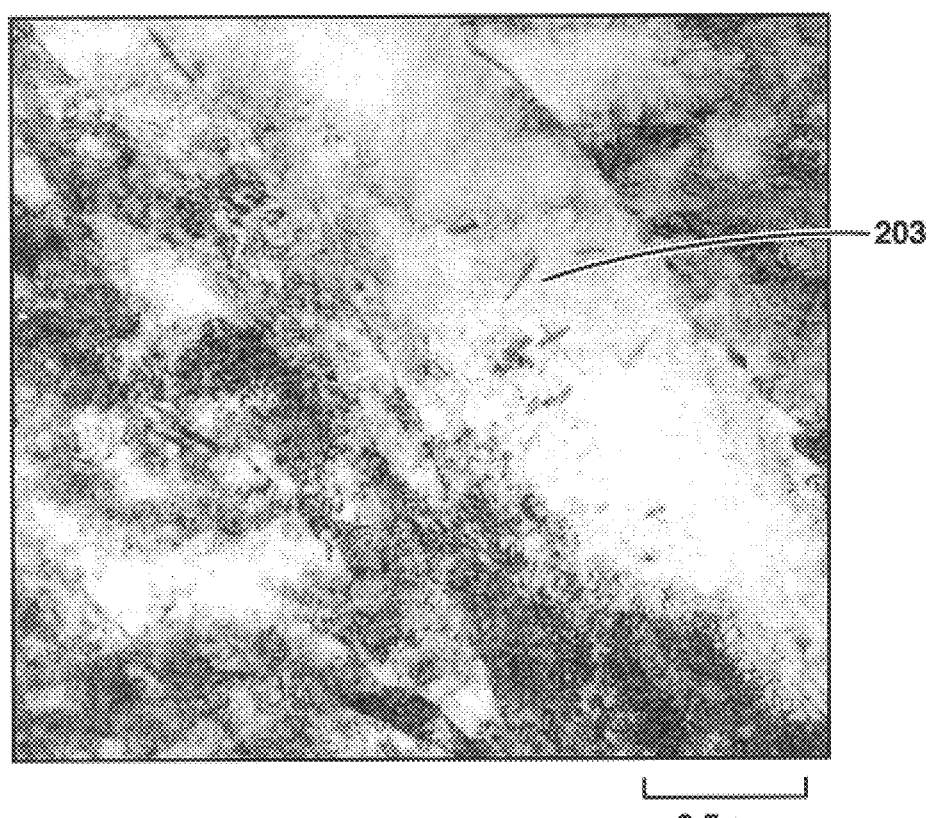
FIG. 20B is an image taken in the TEM of example weld T, a weld metal containing 4 vol. % acicular ferrite. Example weld T is not an AFIM weld metal as defined in this invention.

Weld T, with a weld metal Pcm of 0.327, is an example of a microstructure that does not fit the definition of AFIM because it contains an insufficient amount (4%) of acicular ferrite. By the definition of this invention, AFIM should contain at least about 5% acicular ferrite. Weld T is provided here for comparison purposes. For the cooling rate used with Weld T, the alloy content is too high to allow significant acicular ferrite formation. SEM, FIG. 20A, and TEM, FIG. 20B, micrographs of Weld T are provided. In order of decreasing prevalence, the hard constituent consisted of lath martensite 202, tempered martensite 203 and degenerate upper bainite 204. In this weld metal, the amount of acicular ferrite 201 is insufficient to effectively subdivide the prior austenite grains. As a result, larger sub-units of the hard constituents dominate the microstructure.

Weld Metal Inclusions: The Zr Effect

Welds A and B provide a systematic comparison illustrating the influence of zirconium on inclusions and mechanical properties. Welds A and B were produced using the same welding procedure, shielding gas, and base metal. The only difference was in the filler wire where Weld A used Wire 1 and Weld B used Wire 2. The wire compositions were intentionally similar except that Wire 1 contained no addition of Zr while Wire 2 contained 0.018 wt. %. The weld metals of Welds A and B contained no Zr and 80 ppm Zr, respectively. With the addition of Zr to Weld B, the average inclusion diameter (as compared to Weld A) decreased from 670 nm to 250 nm and the number density of inclusions increased from $1.3 \times 10^{10}$ to $4.6 \times 10^{10}$. These changes led to an improvement in the low temperature toughness of the weld. The Charpy V-notch DBTT is −82° C. for Weld B compared to −48° C. for Weld A. Similarly, the CTOD DBTT decreased from −38° C. to −53° C. with the addition of Zr.

Weld A was found to contain 36 vol. % of acicular ferrite compared to 40 vol. % in Weld B. Because it is known that acicular ferrite nucleates heterogeneously on weld metal inclusions it is believed that the increased amount of acicular ferrite in Weld B is due to the Zr addition. However, this difference is relatively minor and does not account for the entire magnitude of toughness improvement. It is believed by the current inventors that the ability of Zr to produce small inclusions and the resultant finer microstructure are primarily responsible for the toughness improvement in Weld A versus Weld B.

Figure 21:
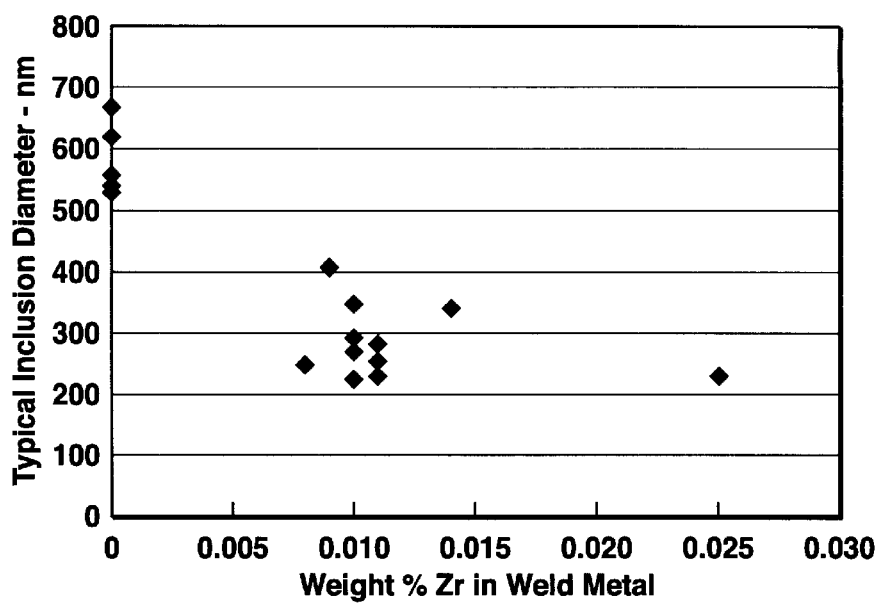
FIG. 21 is a plot of the average inclusion diameter versus the weight percent zirconium in the example welds.
Figure 22:
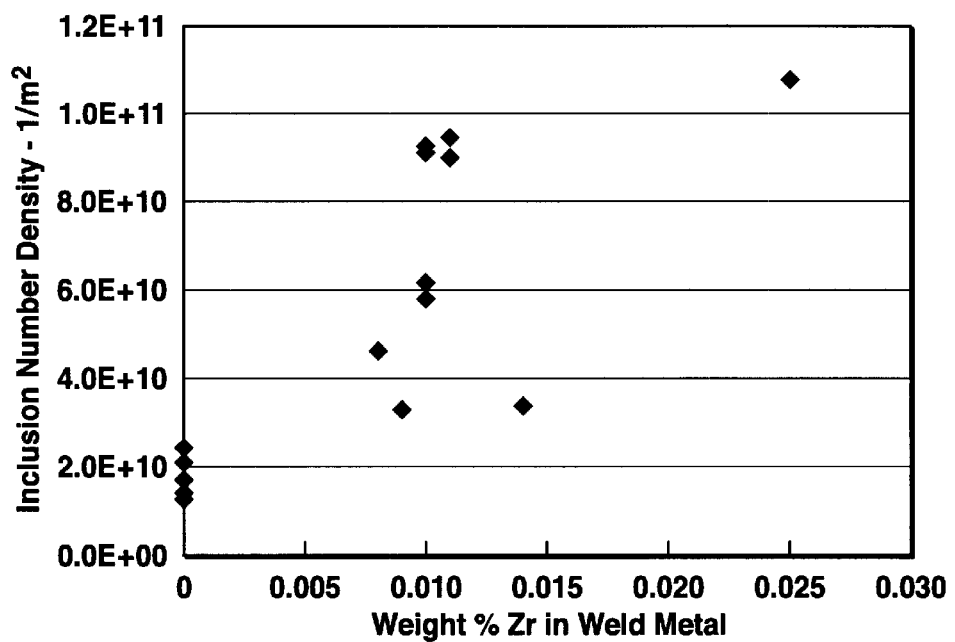
FIG. 22 is a plot of the number of inclusions per unit area observed in a TEM foil versus the weight percent zirconium in the example welds.

Additional comparisons further quantify the effectiveness of Zr in refining weld metal inclusions. Several levels of Zr were added to the filler wires and the size distribution of weld metal inclusions was characterized by TEM. FIG. 21 shows a graph of the average inclusion diameter observed in the TEM as a function of the weld metal Zr content. When Zr was present, inclusion diameter decreased. Specifically, the average inclusion diameter without Zr was about 600 nm while with about 100 ppm Zr it was about half this value (about 300 nm). Zr additions also increased the number of inclusions observed in the TEM thin foils (see FIG. 22). This data and the information given previously about inclusion formation (FIGS. 12–14B) illustrate that when the inclusions nucleate as Zr-rich oxides, the weld metal contains a larger number of small inclusions.

The Effect of Shielding Gas

Steel at room temperature has very little solubility for free oxygen and, therefore, the volume fraction of inclusions in steel weld metals is directly related to the weld metal oxygen content. A primary source of weld metal oxygen during gas metal arc welding is the shielding gas. The current inventors conducted experiments to quantify the effect of shielding gas oxidizing potential on the weld metal oxygen content in AFIM microstructures. For example, Welds Y and DD were made with essentially the same consumable and heat input, but with shielding gases that contained 15% and 5% $CO_2$, respectively. The weld metal oxygen content was 288 ppm for Weld Y and 220 ppm for Weld DD.

In general, decreasing the amount of $CO_2$ and/or $O_2$ in the shielding gas reduces the amount of oxygen in the weld metal. According to the current invention, a preferred range of weld metal oxygen is about 175 to 400 ppm. AFIM microstructures that are useful for many applications can be produced using this broad range of oxygen contents. However, depending on the application, the welding engineer can tailor an AFIM microstructure to meet very demanding toughness requirements. If the highest toughnesses are desired, a more preferred weld metal oxygen range of about 200 to 260 ppm can be produced by proper selection of the shielding gas. For example, a shielding gas composition of argon and about 10% $CO_2$ can generate an oxygen content within the more preferred range.

Mechanical Property Examples

The mechanical properties measured for each weld are listed in Table VII and Table VIII, which are provided after the Abstract. These examples illustrate that superior combinations of strength and toughness can be achieved with AFIM weld metals. Upper shelf Charpy V-notch toughnesses above 170 J were produced in many weld metals with yield strengths above 100 ksi. Even at the highest strength levels, excellent toughness was produced. In Weld DD, which had a yield strength of 136 ksi, an upper shelf Charpy V-notch energy of 168 J was achieved.

AFIM weld metals are capable of producing very low Charpy V-notch DBTTs. As shown in Table VIII, which is provided after the Abstract, several welds produced DBTTs below −100° C. Several welds with very high upper shelf Charpy toughness (>170 J) produced Charpy DBTTs below −75° C. This is significant because high upper shelf toughnesses tend to increase the DBTT because of the way that the transition curve is fitted. As known to those skilled in the art, as the upper shelf increases, the midpoint of the energy versus temperature curve moves to higher temperatures.

As described previously, Weld T falls outside the AFIM definition because of a low acicular ferrite content. The data in Table VII show that Weld T has inferior toughness compared to the AFIM weld metals. The upper shelf energy is only 57 J and the CVN DBTT is −40° C. The properties of Weld T are inferior to the AFIM weld metals because insufficient acicular ferrite is available to absorb energy and to effectively subdivide the prior austenite grains.

The Relationship Between Strength and Upper Shelf Toughness

Figure 23:
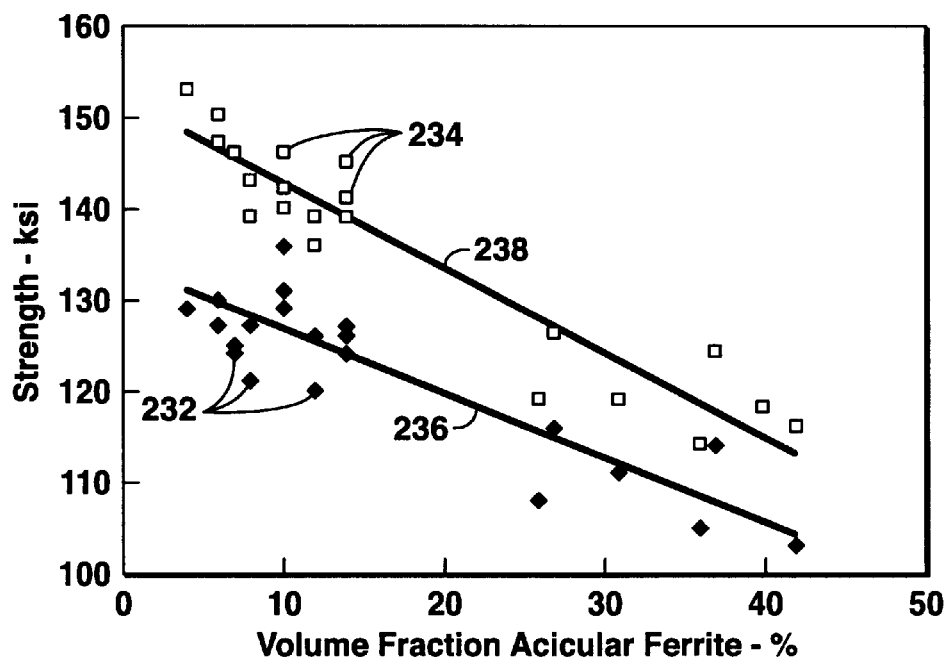
FIG. 23 is a plot of strength versus the volume fraction of acicular ferrite for the example welds.

Since acicular ferrite is more easily deformed than the hard constituents in AFIM weld metals, the volume fraction of acicular ferrite is an important factor in determining the strength potential of an AFIM weld metal. The example weld metals cover a range of acicular ferrite volume fractions from 5% to 42%. In FIG. 23, the yield strength data, e.g., 232, and ultimate tensile strength data, e.g., 234, of example welds are plotted as a function of acicular ferrite content. Linear trendlines determined by a least squares fit are also included. The yield strength trend line 236 shows that yield strength increases from about 105 ksi with 40% acicular ferrite to about 130 ksi with 5% acicular ferrite; and the tensile strength trend line 238 shows that the tensile strength increases from about 115 ksi with 40% acicular ferrite to about 150 ksi with 5% acicular ferrite.

Figure 24:
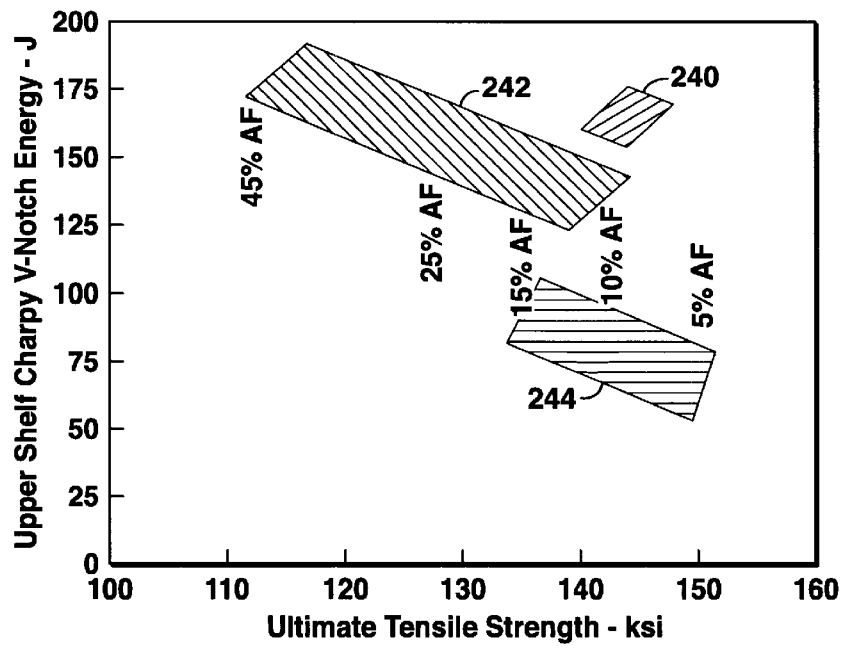
FIG. 24 is a plot of upper shelf Charpy V-notch energy as a function of a ultimate tensile strength for the example welds. The data are separated into groups with different weld oxygen contents.

It is well known that as the strength of structural steels increases, toughness (or flaw tolerance) tends to decrease. FIG. 24 demonstrates this tradeoff in the example AFIM weld metals. Since inclusion content affects weld toughness independently of strength, the data in Table VII and Table VIII were separated into categories based on weld metal oxygen content. Considering an oxygen content range of 250–290 ppm, the upper shelf CVN energy varies from about 190 J with a tensile strength of 115 ksi to about 140 J with a tensile strength of 145 ksi. At higher oxygen contents a similar tradeoff between strength and toughness is apparent, but in general the toughnesses are lower at higher oxygen levels. For the oxygen range of 300 –370 ppm, the maximum Charpy energy measured for a weld metal with a tensile strength of 145 ksi was 95 J.

Since the volume fraction of acicular ferrite correlates with strength, the volume fraction of acicular ferrite for each strength level has been superimposed on FIG. 24. As a result, FIG. 24 summarizes the inventors' data on the relationship between upper shelf toughness, strength, weld metal oxygen content and volume fraction of acicular ferrite for AFIM weld metals. Area 240 includes welds having 210 to 220 ppm oxygen. Area 242 includes welds having 240 to 290 ppm oxygen. Area 244 includes welds having 300 to 370 ppm oxygen.

Figure 25:
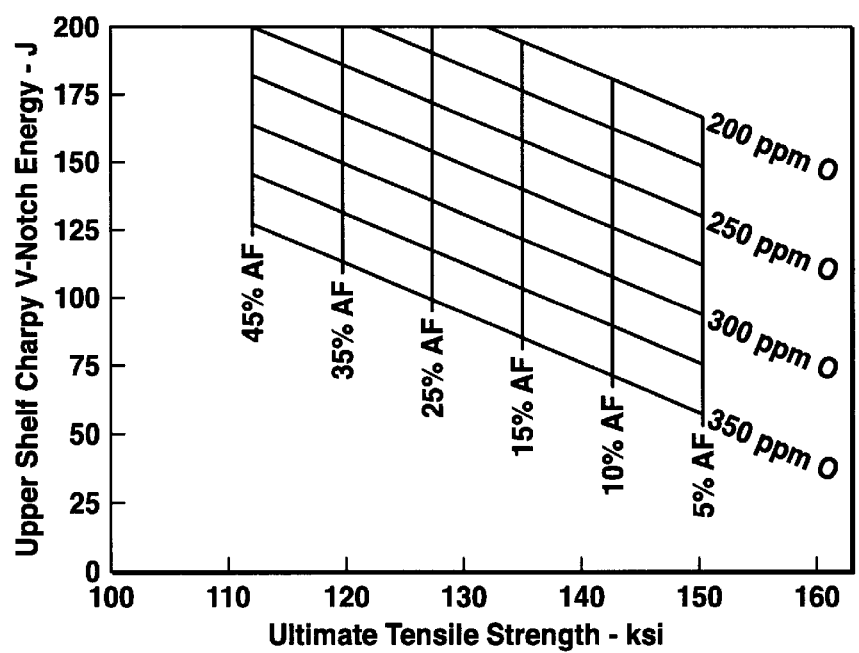
FIG. 25 is a schematic illustrating the relationships between tensile strength, upper shelf Charpy toughness, acicular ferrite content and strength for AFIM weld metals.

To provide a more concise description of the mechanical property relationships of AFIM weld metals, the inventors have generalized the example weld data to create FIG. 25. Basic strength-toughness trends including contours for oxygen level and acicular ferrite volume fraction are given in FIG. 25. In general, for a given oxygen content, as the acicular ferrite content is decreased, higher strength, but lower toughness, is achieved. For a particular application, the welding engineer can control the acicular ferrite content and the oxygen level by choices of weld metal chemistry, shielding gas composition, and welding procedure (weld cooling rates) according to the guidelines of this invention.

The Effect of Oxygen Content on the DBTT

It was previously stated that the DBTT in AFIM weld metals can be improved by adding Zr and reducing inclusion size. In addition to this Zr effect, DBTT improvements can be created by a simple reduction in weld metal oxygen content as controlled by shielding gas composition. Welds made with the same base metal, consumable wire, and welding procedure, but with different shielding gases illustrate this effect. For example, a useful comparison can be made between Welds Y and DD which utilized 15% and 5% $CO_2$ in the shielding gases, respectively. Weld Y contained 288 ppm of oxygen and produced a Charpy DBTT of −55° C. while Weld DD contained 220 ppm of oxygen and produced a DBTT of −79° C.

The Effect of Cooling Rate on Properties

Figure 26:
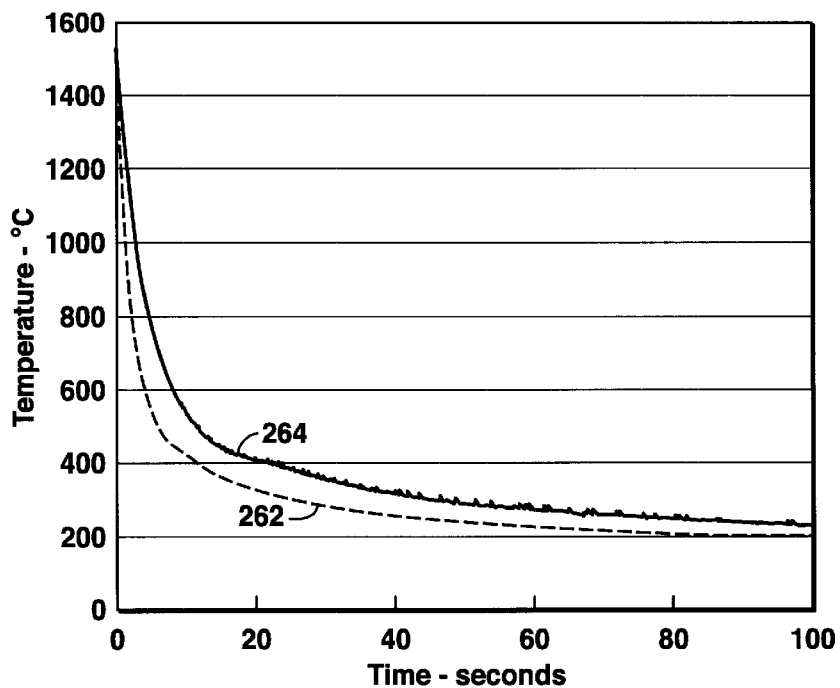
FIG. 26 is a graph of measured cooling curves for weld passes made with heat inputs of 0.95 kJ/mm and 0.62 kJ/mm with a preheat/interpass temperature of 100° C.

Welds Y, Z, and AA demonstrate the general effect of weld cooling rate on the properties of AFIM weld metals. These welds were made with the same consumable wire (#12), base metal, and shielding gas, but with different heat inputs. To those skilled in the art of welding engineering, it is well known that as heat input increases, cooling rate decreases. This is shown in FIG. 26, which are cooling curves measured by thermocouple plunges into pipe welds (described earlier) for two different heat inputs. The higher heat input results in a slower cooling rate. Cooling curve 262 represents a heat input of 0.62 kJ/mm. Cooling curve 264 represents a heat input of 0.95 kJ/mm.

The heat inputs for Welds Y, Z and M were 0.69 kJ/mm, 0.87 kJ/mm, and 1.01 kJ/mm, respectively. The low heat input weld produced yield and tensile strengths of 137 ksi and 142 ksi, respectively. The high heat input weld created yield and tensile strengths of 118 ksi and 132 ksi, respectively. Therefore, decreasing the heat input from about 1 kJ/mm to about 0.7 kJ/mm produced an increase in yield strength of 19 ksi. With respect to Charpy toughness, Welds Y, Z, and AA demonstrate that higher heat inputs increase upper shelf energy. Specifically, increasing the heat input from 0.69 kJ/mm to 1.01 kJ/mm, increased the upper shelf Charpy energy from 139 J to 164 J.

In contrast to other measures of toughness, the Charpy DBTT does not necessarily improve with increased heat input. The microstructural softening caused by higher heat inputs typically improves energy absorption on the upper shelf. However, higher heat inputs can create some microstructural coarsening that provides easier cleavage initiation. This manifests itself as an increase in DBTT. One example of this can be seen by comparing Welds Y and AA. The heat input difference was 0.69 kJ/mm and 1.01 kJ/mm, respectively, while all other variables were similar. The Charpy DBTT was −55° C. for Weld Y and −44° C. for Weld AA. In general, lower heat inputs create faster cooling, finer microstructures (like lath martensite with narrow lath width), and lower DBTT's. This general trend is relative to a preferred heat input range of AFIM weld metals as defined in this patent, 0.30 kJ/mm to 2.5 kJ/mm. Below this range, weld cooling rates may become too fast, thus creating too much untempered and/or twinned martensite; and this can increase the DBTT.

Figure 27:
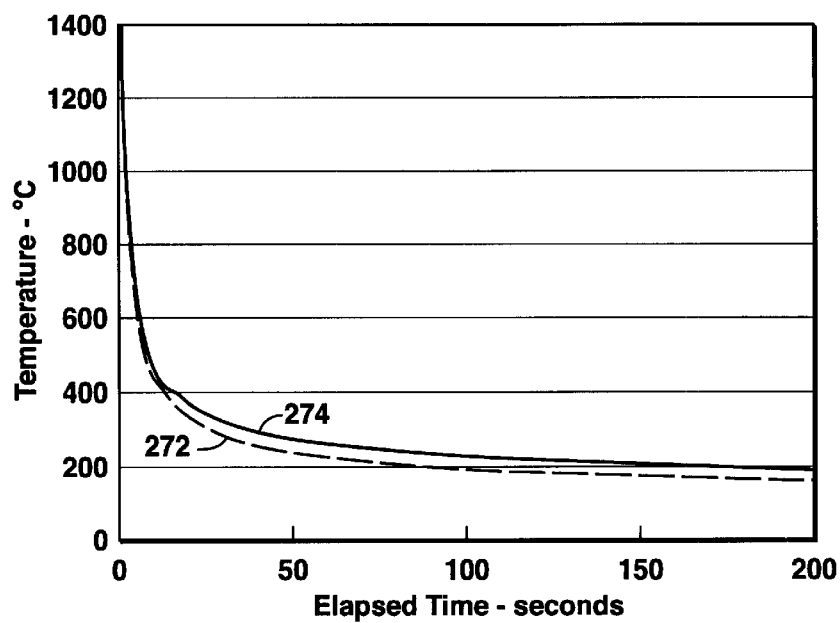
FIG. 27 is a graph of measured cooling curves for weld passes made with interpass temperatures of 104° C. and 150° C.

Preheat and/or interpass temperature is another parameter that can be varied to control weld cooling rate. FIG. 27, which shows measured cooling curves for two different interpass temperatures, illustrates that a higher interpass temperature results in a slower cooling rate. Cooling curve 272 represents an interpass temperature of 104° C. Cooling curve 274 represents an interpass temperature of 150° C. Welds I, J, and K were made with the same wire, shielding gas, procedure, and base metal, but the minimum preheat/interpass temperatures were 50° C., 100° C. and 150° C., respectively. The maximum preheat/interpass temperature for these welds was controlled to within 25° C. of the minimum. Therefore, Weld I had the fastest cooling rate followed by Weld J, then Weld K. As the preheat/interpass temperature increased from 50° C. to 150° C., the weld metal yield strength decreased from 129 ksi to 118 ksi; the tensile strength decreased from 135 ksi to 125 ksi; the upper shelf Charpy toughness increased from 77 J to 106 J; and the DBTT changed from −104° C. to −90° C.

The same trends were observed in both series of welds used to illustrate the effect of cooling rate on properties. As cooling rate increases (lower heat input and/or lower preheat/interpass), strength increases, upper shelf toughness decreases, and DBTT decreases (improves). The changes in properties with cooling rate can be attributed to changes in microstructure. As cooling rate increases the volume fraction of acicular ferrite decreases. The acicular ferrite is replaced by "hard constituents" like lath martensite and this increases the strength and decreases upper shelf toughness. However, because the hard constituent is often finer than the acicular ferrite due to a lower transformation temperature, the stronger microstructures often have a greater resistance to cleavage initiation and a lower DBTT.

Although this invention is well suited for the joining of HSLA steel linepipe, it is not limited thereto; rather, this invention is suitable for the joining of any HSLA steels with yield strengths within the range of about 690 MPa (100 ksi) to about 931 MPa (135 ksi), and particularly for applications that require superior low temperature toughness. Additionally, while the present invention has been described in terms of one or more preferred embodiments, it is to be understood that other modifications may be made without departing from the scope of the invention, which is set forth in the claims below.

Glossary of Terms

AFIM: acicular ferrite interspersed in martensite;
$Ar_1$ transformation temperature: the temperature at which transformation of austenite to ferrite or to ferrite plus cementite is completed during cooling;
$Ar_3$ transformation temperature: the temperature at which austenite begins to transform to ferrite during cooling;
aspect ratio: mean ratio of length to thickness;
CTOD: crack tip opening displacement;
DBTT (Ductile to Brittle Transition Temperature): delineates the two fracture regimes in structural steels; at temperatures below the DBTT, failure tends to occur by low energy cleavage (brittle) fracture, while at temperatures above the DBTT, failure tends to occur by high energy ductile fracture;
fracture critical: means that if a fracture occurs, the structure in which the fracture occurs is not suitable for its intended application, i.e., containment of pressurized fluids is generally a fracture critical application;
GMAW: gas metal arc welding;
HSLA: high strength, low alloy;
high strength, low alloy (HSLA) steel: any steel containing iron and less than about 10 wt % total alloy additives and having a yield strength of at least about 550 MPa (80 ksi);
J: joules;
$J_{IC}$ values: the fracture toughness of a material measured in a J-integral test for slow rates of loading; $J_{IC}$ is the J-integral near the onset of stable crack extension; $J_{IC}$ can be measured for materials that undergo substantial plastic deformation before the onset of stable crack extension;
LCBF: low carbon bainitic ferrite;
mean: arithmetic mean, i.e., the average of a collection of values obtained by dividing the sum of the values by the quantity of values;

Ms transformation temperature: the temperature at which transformation of austenite to martensite starts during cooling;
Pcm: a well-known industry term used to express weldability; also, Pcm=(wt % C+wt % Si/30+(wt % Mn+wt % Cu+wt % Cr)/20+wt % Ni/60+wt % Mo/15+wt % V/10+5(wt % B));
PGMAW: pulsed gas metal arc welding;
ppm: parts per million;
predominant/predominantly: at least about 50 volume percent;
prior austenite grains: austenite grains in a metal before the metal is cooled to the temperature range in which austenite undergoes phase transformation to other constituents;
weld metal: the welding consumable wire (and flux, if used) as deposited and diluted by the portion of the base metal that melts during performance of the welding process or that portion of a weldment that was rendered molten during the welding operation; this volume of material is a mixture of the base metal and the welding consumables; and
weldment: A welded joint, including: (i) the weld metal, (ii) the heat-affected zone (HAZ), and (iii) the base metal in the "near vicinity" of the HAZ. The portion of the base metal that is considered within the "near vicinity" of the HAZ, and therefore, a part of the weldment, varies depending on factors known to those skilled in the art, for example, without limitation, the width of the weldment, the size of the item that was welded, the number of weldments required to fabricate the item, and the distance between weldments.

TABLE II

|  | Yield Strength Range |  |
| --- | --- | --- |
| Yield Strength of about 100 ksi |  | Yield Strength of about 135 ksi |
|  | Upper Shelf Charpy Toughness Range |  |
| Upper Shelf Energy of about 180 J |  | Upper Shelf Energy of about 140 J |
| Chemistry | Lower alloy content; Pcm of about 0.23 | Higher alloy content; Pcm of about 0.30 |
| Acicular Ferrite | 30 to 45 volume percent | about 5 volume percent |
| Hard Constituent | Mixture of degenerate upper bainite, lath martensite, granular bainite, and lower bainite | Mixture of lath martensite, degenerate upper bainite, granular bainite, and lower bainite |
| Welding Conditions | Heat Input of 1.0 to 1.5 kJ/mm | Heat Input of about 0.3 to 0.6 kJ/mm |

TABLE III

Chemistries, Wt %, of the wires used to make the example welds.

| Wire | C | S | Mn | P | Si | Cr | Mo | Ni | Cu | V | Nb | Ti | Al | B | Zr | N | O | Pcm |
| --- | --- | --- | --- | --- | --- | --- | --- | --- | --- | --- | --- | --- | --- | --- | --- | --- | --- | --- |
| 1 | 0.047 | 0.001 | 1.69 | 0.002 | 0.38 | 0.25 | 0.61 | 2.79 | 0.14 | 0.002 | 0.0022 | 0.020 | 0.001 | 0.0003 | 0.000 | 0.0013 | 0.0021 | 0.253 |
| 2 | 0.055 | 0.001 | 1.71 | 0.002 | 0.38 | 0.21 | 0.61 | 2.85 | 0.13 | 0.002 | 0.0002 | 0.022 | 0.003 | 0.0003 | 0.018 | 0.0011 | 0.0020 | 0.260 |
| 3 | 0.053 | 0.001 | 1.68 | 0.002 | 0.38 | 0.00 | 0.61 | 3.68 | 0.13 | 0.001 | 0.0002 | 0.018 | 0.003 | 0.0004 | 0.000 | 0.0012 | 0.0019 | 0.260 |
| 4 | 0.056 | 0.001 | 1.80 | 0.001 | 0.38 | 0.20 | 0.59 | 2.88 | 0.26 | 0.001 | 0.0002 | 0.019 | 0.005 | 0.0004 | 0.000 | 0.0013 | 0.0021 | 0.271 |
| 5 | 0.055 | 0.001 | 1.70 | 0.001 | 0.38 | 0.21 | 0.60 | 3.60 | 0.27 | 0.001 | 0.0002 | 0.018 | 0.003 | 0.0005 | 0.000 | 0.0011 | 0.0017 | 0.279 |
| 6 | 0.053 | 0.001 | 1.71 | 0.002 | 0.37 | 0.20 | 0.60 | 3.18 | 0.30 | 0.001 | 0.0002 | 0.020 | 0.005 | 0.0003 | 0.019 | 0.0010 | 0.0022 | 0.270 |
| 9 | 0.038 | 0.001 | 1.71 | 0.002 | 0.37 | 0.59 | 0.60 | 3.12 | 0.14 | 0.001 | 0.0003 | 0.020 | 0.003 | 0.0003 | 0.000 | 0.0010 | 0.0023 | 0.266 |
| 10 | 0.072 | 0.001 | 1.72 | 0.001 | 0.38 | 0.20 | 0.60 | 2.82 | 0.14 | 0.001 | 0.0002 | 0.020 | 0.005 | 0.0003 | 0.000 | 0.0011 | 0.0023 | 0.276 |
| 11 | 0.059 | 0.002 | 1.89 | 0.001 | 0.39 | 0.21 | 0.60 | 3.08 | 0.17 | 0.000 | 0.001 | 0.015 | — | 0.0005 | 0.019 | 0.0013 | 0.0014 | 0.279 |
| 12 | 0.060 | 0.003 | 1.89 | 0.001 | 0.65 | 0.20 | 0.60 | 3.06 | 0.18 | 0.000 | 0.001 | 0.014 | — | 0.0004 | 0.019 | 0.0012 | 0.0015 | 0.288 |
| 13 | 0.063 | 0.003 | 1.89 | 0.001 | 0.40 | 0.20 | 0.60 | 3.07 | 0.18 | 0.000 | 0.001 | 0.014 | — | 0.0012 | 0.019 | 0.0013 | 0.0016 | 0.287 |
| 14 | 0.062 | 0.002 | 1.90 | 0.001 | 0.39 | 0.20 | 0.60 | 3.08 | 0.16 | 0.031 | 0.001 | 0.015 | — | 0.0005 | 0.018 | 0.0011 | 0.0012 | 0.285 |
| 15 | 0.065 | 0.002 | 1.90 | 0.00 | 0.39 | 0.20 | 0.59 | 3.07 | 0.16 | 0.000 | 0.001 | 0.014 | — | 0.0004 | 0.040 | 0.0016 | 0.0017 | 0.284 |
| 16 | 0.058 | 0.003 | 1.90 | 0.001 | 0.39 | 0.20 | 0.59 | 3.04 | 0.18 | 0.000 | 0.001 | 0.002 | — | 0.0004 | 0.017 | 0.0025 | 0.0024 | 0.277 |
| 17 | 0.067 | 0.003 | 1.90 | 0.001 | 0.39 | 0.49 | 0.60 | 3.08 | 0.21 | 0.000 | 0.001 | 0.015 | — | 0.0004 | 0.019 | 0.0014 | 0.0015 | 0.303 |
| 19 | 0.079 | 0.003 | 1.90 | 0.001 | 0.40 | 0.50 | 0.60 | 3.05 | 0.18 | 0.000 | 0.001 | 0.008 | — | 0.0004 | 0.019 | 0.0013 | 0.0015 | 0.314 |
| 20 | 0.064 | 0.004 | 2.01 | 0.001 | 0.68 | 0.62 | 0.59 | 3.08 | 0.27 | 0.032 | 0.001 | 0.008 | — | 0.0013 | 0.019 | 0.0017 | 0.0014 | 0.332 |

"—" indicates none detected.
NOTE:
Twenty experimental wires were made. Chemistries of wires identified as 7, 8, and 18 are not included in Table III (one of these wires contained extra alloying, one of these wires did not meet the desired chemistry for that wire, and one of these wires contained manganese outside the preferred range of this invention); data regarding welds made with these wires are not included in Tables IV–VIII. Data regarding welds made with wire 20, which included boron outside the preferred range of this invention, are included in Tables IV, VI, and VIII for comparison purposes.

TABLE IV

Chemistries, Wt %, of Example Weld Metals

| Weld | Wire | C | S | Mn | P | Si | Cr | Mo | Ni | Cu | V |
|---|---|---|---|---|---|---|---|---|---|---|---|
| | | | | | Plate Welds | | | | | | |
| A | 1 | 0.059 | 0.001 | 1.48 | 0.002 | 0.26 | 0.23 | 0.56 | 2.41 | 0.160 | 0.007 |
| B | 2 | 0.062 | 0.001 | 1.52 | 0.002 | 0.25 | 0.21 | 0.55 | 2.36 | 0.170 | 0.007 |
| C | 3 | 0.063 | 0.001 | 1.51 | 0.002 | 0.25 | 0.03 | 0.55 | 3.03 | 0.170 | 0.007 |
| D | 4 | 0.066 | 0.001 | 1.60 | 0.002 | 0.25 | 0.20 | 0.55 | 2.38 | 0.270 | 0.006 |
| E | 5 | 0.063 | 0.001 | 1.51 | 0.002 | 0.25 | 0.21 | 0.55 | 3.11 | 0.260 | 0.006 |
| F | 6 | 0.066 | 0.001 | 1.52 | 0.002 | 0.25 | 0.20 | 0.55 | 2.58 | 0.300 | 0.007 |
| G | 9 | 0.051 | 0.001 | 1.49 | 0.002 | 0.25 | 0.52 | 0.55 | 2.64 | 0.180 | 0.007 |
| H | 10 | 0.074 | 0.001 | 1.49 | 0.002 | 0.24 | 0.20 | 0.56 | 2.40 | 0.180 | 0.007 |
| | | | | | Pipe Welds | | | | | | |
| I | 6 | †† | †† | †† | †† | †† | †† | †† | †† | †† | †† |
| J | 6 | 0.067 | 0.002 | 1.57 | 0.003 | 0.34 | 0.28 | 0.58 | 2.83 | 0.29 | 0.004 |
| K | 6 | †† | †† | †† | †† | †† | †† | †† | †† | †† | †† |
| L | 11 | 0.066 | 0.002 | 1.78 | 0.001 | 0.31 | 0.22 | 0.57 | 2.72 | 0.14 | 0.008 |
| M | 12 | 0.067 | 0.002 | 1.79 | 0.001 | 0.52 | 0.23 | 0.58 | 2.73 | 0.15 | 0.008 |
| N | 13 | 0.068 | 0.002 | 1.79 | 0.001 | 0.34 | 0.22 | 0.57 | 2.78 | 0.17 | 0.006 |
| O | 14 | 0.066 | 0.002 | 1.80 | 0.002 | 0.32 | 0.22 | 0.57 | 2.73 | 0.14 | 0.036 |
| P | 15 | 0.067 | 0.002 | 1.79 | 0.002 | 0.32 | 0.22 | 0.56 | 2.74 | 0.15 | 0.007 |
| Q | 16 | 0.064 | 0.002 | 1.77 | 0.002 | 0.31 | 0.22 | 0.56 | 2.74 | 0.18 | 0.006 |
| R | 17 | 0.074 | 0.002 | 1.81 | 0.002 | 0.33 | 0.48 | 0.57 | 2.78 | 0.19 | 0.007 |
| S | 19 | 0.081 | 0.002 | 1.81 | 0.001 | 0.34 | 0.50 | 0.57 | 2.78 | 0.17 | 0.006 |
| T* | 20 | 0.073 | 0.002 | 1.92 | 0.002 | 0.61 | 0.61 | 0.57 | 2.81 | 0.25 | 0.035 |
| U | 11 | 0.070 | 0.002 | 1.78 | 0.002 | 0.29 | 0.22 | 0.54 | 2.64 | 0.14 | 0.012 |
| V | 12 | 0.066 | 0.002 | 1.77 | 0.001 | 0.52 | 0.22 | 0.58 | 2.71 | 0.14 | 0.009 |
| W | 12 | 0.065 | 0.002 | 1.80 | 0.001 | 0.56 | 0.22 | 0.57 | 2.68 | 0.16 | 0.008 |
| X | 19 | 0.078 | 0.002 | 1.80 | 0.002 | 0.33 | 0.50 | 0.58 | 2.75 | 0.16 | 0.007 |
| Y | 12 | 0.065 | 0.002 | 1.76 | 0.002 | 0.52 | 0.22 | 0.57 | 2.69 | 0.17 | 0.008 |
| Z | 12 | 0.065 | 0.002 | 1.75 | 0.002 | 0.50 | 0.22 | 0.56 | 2.63 | 0.14 | 0.010 |
| AA | 12 | 0.065 | 0.002 | 1.75 | 0.002 | 0.50 | 0.22 | 0.55 | 2.58 | 0.16 | 0.011 |
| BB | 12 | 0.063 | 0.002 | 1.77 | 0.002 | 0.52 | 0.22 | 0.56 | 2.61 | 0.15 | 0.010 |
| CC | 12 | 0.061 | 0.002 | 1.76 | 0.002 | 0.54 | 0.22 | 0.57 | 2.65 | 0.16 | 0.008 |
| DD | 12 | 0.061 | 0.002 | 1.80 | 0.002 | 0.57 | 0.22 | 0.57 | 2.72 | 0.18 | 0.007 |
| EE | 12 | 0.060 | 0.002 | 1.78 | 0.002 | 0.53 | 0.22 | 0.57 | 2.66 | 0.16 | 0.009 |
| FF | 12 | 0.060 | 0.002 | 1.80 | 0.002 | 0.57 | 0.22 | 0.57 | 2.70 | 0.16 | 0.008 |

| Weld | Wire | Nb | Ti | Al | B | Zr | N | O | Pcm |
|---|---|---|---|---|---|---|---|---|---|
| | | | | Plate Welds | | | | | |
| A | 1 | 0.004 | 0.007 | 0.001 | 0.0004 | 0.000 | 0.0076 | 0.0247 | 0.241 |
| B | 2 | 0.004 | 0.007 | 0.002 | 0.0005 | 0.008 | 0.0058 | 0.0253 | 0.245 |
| C | 3 | 0.004 | 0.006 | 0.001 | 0.0005 | 0.000 | 0.0062 | 0.0252 | 0.247 |
| D | 4 | 0.003 | 0.006 | 0.002 | 0.0005 | 0.000 | 0.0141 | 0.0251 | 0.257 |
| E | 5 | 0.004 | 0.006 | 0.001 | 0.0005 | 0.000 | 0.0101 | 0.0255 | 0.262 |
| F | 6 | 0.004 | 0.006 | 0.002 | 0.0006 | 0.009 | 0.0071 | 0.0268 | 0.259 |
| G | 9 | 0.004 | 0.006 | 0.001 | 0.0005 | 0.000 | 0.0154 | 0.0271 | 0.253 |
| H | 10 | 0.004 | 0.006 | 0.002 | 0.0005 | 0.000 | 0.0053 | 0.0241 | 0.256 |
| | | | | Pipe Welds | | | | | |
| I | 6 | †† | †† | †† | †† | †† | †† | †† | †† |
| J | 6 | 0.001 | 0.014 | 0.002 | 0.0004 | 0.008 | 0.002 | 0.0339 | 0.274 |
| K | 6 | †† | †† | †† | †† | †† | †† | †† | †† |
| L | 11 | 0.004 | 0.008 | <0.001 | 0.0004 | 0.010 | 0.0020 | 0.0309 | 0.269 |
| M | 12 | 0.004 | 0.008 | <0.001 | 0.0004 | 0.010 | 0.0017 | 0.0298 | 0.280 |
| N | 13 | 0.003 | 0.008 | 0.001 | 0.0012 | 0.011 | 0.0022 | 0.0349 | 0.279 |
| O | 14 | 0.004 | 0.008 | <0.001 | 0.0004 | 0.010 | 0.0017 | 0.0318 | 0.274 |
| P | 15 | 0.003 | 0.008 | <0.001 | 0.0004 | 0.025 | 0.0022 | 0.0362 | 0.271 |
| Q | 16 | 0.003 | 0.001 | <0.001 | 0.0005 | 0.010 | 0.0046 | 0.0367 | 0.269 |
| R | 17 | 0.004 | 0.008 | <0.001 | 0.0005 | 0.011 | 0.0021 | 0.0348 | 0.297 |
| S | 19 | 0.003 | 0.005 | <0.001 | 0.0005 | 0.011 | 0.0020 | 0.0338 | 0.304 |
| T* | 20 | 0.004 | 0.005 | <0.001 | 0.0013 | 0.012 | 0.0020 | 0.0327 | 0.327 |
| U | 11 | 0.005 | 0.007 | <0.001 | 0.0005 | 0.006 | 0.0019 | 0.0358 | 0.270 |
| V | 12 | 0.004 | 0.008 | <0.001 | 0.0004 | 0.010 | 0.0018 | 0.0307 | 0.277 |
| W | 12 | 0.004 | 0.009 | 0.001 | 0.0005 | 0.010 | 0.0018 | 0.0310 | 0.279 |
| X | 19 | 0.004 | 0.005 | <0.001 | 0.0005 | 0.011 | 0.0022 | 0.0348 | 0.300 |
| Y | 12 | 0.004 | 0.008 | <0.001 | 0.0005 | 0.011 | 0.0038 | 0.0288 | 0.276 |
| Z | 12 | 0.004 | 0.007 | <0.001 | 0.0005 | 0.009 | 0.0036 | 0.0286 | 0.272 |
| AA | 12 | 0.005 | 0.007 | 0.001 | 0.0005 | 0.008 | 0.0042 | 0.0316 | 0.271 |
| BB | 12 | 0.004 | 0.008 | <0.001 | 0.0005 | 0.011 | 0.0022 | 0.0239 | 0.272 |
| CC | 12 | 0.004 | 0.008 | <0.001 | 0.0005 | 0.011 | 0.0060 | 0.0283 | 0.271 |
| DD | 12 | 0.003 | 0.009 | <0.001 | 0.0005 | 0.014 | 0.0043 | 0.0220 | 0.277 |

TABLE IV-continued

Chemistries, Wt %, of Example Weld Metals

| | | | | | | | | | |
|---|---|---|---|---|---|---|---|---|---|
| EE | 12 | 0.004 | 0.008 | <0.001 | 0.0005 | 0.010 | 0.0119 | 0.0301 | 0.271 |
| FF | 12 | 0.004 | 0.009 | <0.001 | 0.0005 | 0.014 | 0.0025 | 0.0216 | 0.274 |

"††" indicates data not collected. Welds I and K were made with the same wire, shielding gas, procedure, and base metal as weld J. The preheat interpass temperatures were different.

*Weld T is not representative of this invention and is included for comparison purposes only.

TABLE V

Summary of Welding Procedures Used for Plate Welds

| Weld | Wire | Minimum Preheat Temperature (° C.) | Maximum Interpass Temperature (° C.) | Average Heat Input[1] (kJ/mm) | Shielding Gas Composition (%) Ar | He | $CO_2$ | Plate Dimensions (length × width × thickness) |
|---|---|---|---|---|---|---|---|---|
| A | 1 | 100 | 200 | 0.87 | 85 | 0 | 15 | 24" × 10" × 20 mm |
| B | 2 | 100 | 200 | 0.87 | 85 | 0 | 15 | 24" × 10" × 20 mm |
| C | 3 | 100 | 200 | 0.89 | 85 | 0 | 15 | 24" × 10" × 20 mm |
| D | 4 | 100 | 200 | 0.88 | 85 | 0 | 15 | 24" × 10" × 20 mm |
| E | 5 | 100 | 200 | 0.88 | 85 | 0 | 15 | 24" × 10" × 20 mm |
| F | 6 | 100 | 200 | 0.88 | 85 | 0 | 15 | 24" × 10" × 20 mm |
| G | 9 | 100 | 200 | 0.87 | 85 | 0 | 15 | 24" × 10" × 20 mm |
| H | 10 | 100 | 200 | 0.87 | 85 | 0 | 15 | 24" × 10" × 20 mm |

[1]Average heat input per pass of the fill and cap passes.

TABLE VI

Summary of Welding Procedures Used for Pipe Welds

| Weld | Wire | Minimum Preheat Temperature (° C.) | Maximum Interpass Temperature (° C.) | Average Heat Input[2] (kJ/mm) | Shielding Gas Composition (%) Ar | He | $CO_2$ | Pipe Dimensions (outside diameter × wall thickness) |
|---|---|---|---|---|---|---|---|---|
| I | 6 | 50 | 75 | †† | 85 | 0 | 15 | 30" × 16 mm |
| J | 6 | 100 | 125 | 0.73 | 85 | 0 | 15 | 30" × 16 mm |
| K | 6 | 150 | 175 | 0.72 | 85 | 0 | 15 | 30" × 16 mm |
| L | 11 | 100 | 125 | 0.63 | 85 | 0 | 15 | 36" × 16 mm |
| M | 12 | 100 | 125 | 0.68 | 85 | 0 | 15 | 36" × 16 mm |
| N | 13 | 100 | 125 | 0.71 | 85 | 0 | 15 | 36" × 16 mm |
| O | 14 | 100 | 125 | 0.72 | 85 | 0 | 15 | 36" × 16 mm |
| P | 15 | 100 | 125 | 0.70 | 85 | 0 | 15 | 36" × 16 mm |
| Q | 16 | 100 | 125 | 0.75 | 85 | 0 | 15 | 36" × 16 mm |
| R | 17 | 100 | 125 | 0.73 | 85 | 0 | 15 | 36" × 16 mm |
| S | 19 | 100 | 125 | 0.74 | 85 | 0 | 15 | 36" × 16 mm |
| T* | 20 | 100 | 125 | 0.73 | 85 | 0 | 15 | 36" × 16 mm |
| U | 11 | 100 | 125 | 0.75 | 85 | 0 | 15 | 36" × 16 mm |
| V | 12 | 100 | 125 | 0.75 | 85 | 0 | 15 | 36" × 16 mm |
| W | 12 | 150 | 175 | 0.72 | 85 | 0 | 15 | 36" × 16 mm |
| X | 19 | 150 | 175 | 0.73 | 85 | 0 | 15 | 36" × 16 mm |
| Y | 12 | 100 | 125 | 0.69 | 85 | 0 | 15 | 36" × 16 mm |
| Z | 12 | 100 | 125 | 0.87 | 85 | 0 | 15 | 36" × 16 mm |
| AA | 12 | 100 | 125 | 1.01 | 85 | 0 | 15 | 36" × 16 mm |
| BB | 12 | 100 | 125 | 0.85 | 90 | 0 | 10 | 36" × 16 mm |
| CC | 12 | 100 | 125 | 0.67 | 80 | 10 | 10 | 36" × 16 mm |
| DD | 12 | 100 | 125 | 0.68 | 85 | 10 | 5 | 36" × 16 mm |
| EE | 12 | 100 | 125 | 0.68 | 65 | 25 | 10 | 36" × 16 mm |
| FF | 12 | 100 | 125 | 0.73 | 70 | 25 | 5 | 36" × 16 mm |

[2]Average heat input per pass of the fill and cap passes.
"††"indicates data not collected. Welding parameters were similar to Examples J and K.
*Weld T is not representative of this invention and is included for comparison purposes only.

TABLE VII

Mechanical properties of example welds made on plate.

| Weld | Wire | Weld Metal Yield Strength 0.2% Offset (ksi) | Weld Metal Tensile Strength (ksi) | Elongation (%) | Charpy Results Upper Shelf Energy (J) | Charpy Results Transition Temperature (° C.) | CTOD Results Upper Shelf CTOD (mm) | CTOD Results Transition Temperature (° C.) |
|---|---|---|---|---|---|---|---|---|
| A | 1 | 105 | 114 | 25.5 | 172 | −48 | 0.28 | −38 |
| B | 2 | — | 118 | 24.0 | 188 | −82 | 0.36 | −53 |
| C | 3 | 111 | 119 | 24.4 | 174 | −79 | 0.30 | −55 |
| D | 4 | 108 | 119 | 24.9 | 177 | −42 | 0.30 | −56 |
| E | 5 | 116 | 126 | 23.7 | 174 | −57 | 0.25 | −43 |
| F | 6 | 114 | 124 | 24.2 | 178 | −80 | 0.36 | −59 |
| G | 9 | 103 | 116 | 24.1 | 177 | −49 | 0.32 | −36 |
| H | 10 | 101 | 117 | 26.8 | 161 | −62 | 0.32 | −53 |

"—" indicates not measured

TABLE VIII

Mechanical properties of example welds made on pipe.

| Weld | Wire | Weld Metal Yield Strength 0.2% Offset (ksi) | Weld Metal Tensile Strength (ksi) | Elongation (%) | Charpy Results Upper Shelf Energy (J) | Charpy Results Transition Temperature (° C.) | J Integral Test Results $J^3$ @ −20° C. (ksi-in) | J Integral Test Results Approximate DBTT (° C.) |
|---|---|---|---|---|---|---|---|---|
| I | 6 | 129 | 135 | 21 | 77 | −104 | — | — |
| J | 6 | 126 | 136 | 19 | — | — | — | — |
| K | 6 | 118 | 125 | 22 | 106 | −90 | — | — |
| L | 11 | 129 | 142 | 22 | 87 | −93 | 0.83 | <−70 |
| M | 12 | 126 | 145 | 21 | 95 | −84 | 1.03 | <−70 |
| N | 13 | 127 | 143 | 21 | 88 | −84 | 1.04 | <−70 |
| O | 14 | 127 | 141 | 18 | 81 | −95 | 0.70 | <−70 |
| P | 15 | 124 | 139 | 22 | 92 | −101 | 0.90 | <−70 |
| Q | 16 | 121 | 139 | 21 | 72 | −94 | 0.76 | <−70 |
| R | 17 | 125 | 146 | 21 | 66 | −97 | 0.98 | <−70 |
| S | 19 | 127 | 147 | 21 | 58 | −107 | 0.90 | <−70 |
| T* | 20 | 129 | 153 | 22 | 57 | −40 | — | — |
| U | 11 | 122 | 135 | 19 | 90 | −88 | — | — |
| V | 12 | 123 | 142 | 22 | 90 | −83 | 0.92 | <−70 |
| W | 12 | 120 | 139 | 23 | 100 | −85 | 1.11 | <−70 |
| X | 19 | 124 | 146 | 23 | 67 | −107 | 0.90 | <−70 |
| Y | 12 | 137 | 142 | 22 | 139 | −55 | 1.03 | −50 |
| Z | 12 | 128 | 135 | 21 | 140 | −53 | 1.24 | −55 |
| AA | 12 | 118 | 132 | 22 | 164 | −44 | 1.13 | −45 |
| BB | 12 | 125 | 139 | 19 | 138 | −63 | 1.12 | −65 |
| CC | 12 | 136 | 142 | 22 | 144 | −69 | 1.30 | −65 |
| DD | 12 | 136 | 146 | 18 | 168 | −79 | 1.19 | −55 |
| EE | 12 | 129 | 140 | 17 | 146 | −69 | 1.33 | −75 |
| FF | 12 | 131 | 142 | 16 | 155 | −70 | 1.37 | −55 |

$^3$J value reported is the lowest of at least three tests.
"—" indicates not measured
*Weld T is not representative of this invention and is included for comparison purposes only.

We claim:

1. A weld metal having a microstructure comprising more than 5 vol % to about 45 vol % acicular ferrite and at least about 50 vol % lath martensite, degenerate upper bainite, lower bainite, granular bainite, or mixtures thereof, and further having a yield strength of at least about 690 MPa (100 ksi), a DBTT lower than about −50° C. (−58° F) as measured by a Charpy V-notch energy versus temperature curve.

2. A weld metal comprising iron and the following alloying elements in the weight percents indicated:
   about 0.04 wt % to about 0.08 wt % carbon;
   about 1.0 wt % to about 2.0 wt % manganese;
   about 0.2 wt % to about 0.7 wt % silicon;
   about 0.30 wt % to 0.80 wt % molybdenum;
   about 2.3 wt % to about 3.5 wt % nickel;
   about 0.0175 wt % to about 0.0400 wt % oxygen; and
   at least one additive selected from the group consisting of
   (i) up to
   about 0.04 wt % zirconium, and (ii) up to about 0.02 wt % titanium; wherein the microstructure of said weld metal comprises more than 5 vol % to about 45 vol % acicular ferrite and at least about 50 vol % lath martensite, degenerate upper bainite, lower bainite, granular bainite, or mixtures thereof.

3. The weld metal of claim 2 further comprising the following alloying elements in the weight percents indicated:
    less than about 0.01 wt % phosphorus;
    less than about 0.01 wt % sulfur;
    up to about 0.03 wt % aluminum; and
    less than about 0.020 wt % nitrogen.

4. The weld metal of claim 3 further comprising at least one additive selected from the group consisting of (I) up to about 0.60 wt % chromium, (ii) up to about 0.60 wt % copper, (iii) up to about 0.040 wt % vanadium, and (iv) up to about 0.0012 wt % boron.

5. A weld metal comprising iron and the following alloying elements in the weight percents indicated:
    about 0.055 wt % to about 0.07 wt % carbon;
    about 1.80 wt % manganese;
    about 0.5 wt % silicon;
    about 0.60 wt % molybdenum;
    about 2.7 wt % nickel;
    about 0.0200 wt % to about 0.0260 wt % oxygen; and
    at least one additive selected from the group consisting of (i) 0.01 wt % zirconium, and (ii) about 0.01 wt % titanium;
    wherein the microstructure of said weld metal comprises more than 5 vol % to about 45 vol % acicular ferrite and at least about 50 vol % lath martensite, degenerate upper bainite, lower bainite, granular bainite, or mixtures thereof.

6. The weld metal of claim 5 further comprising the following alloying elements in the weight percents indicated:
    less than about 0.008 wt % phosphorus;
    less than about 0.004 wt % sulfur;
    up to about 0.008 wt % aluminum; and
    less than about 0.007 wt % nitrogen.

7. The weld metal of claim 6 further comprising at least one additive selected from the group consisting of (i) 0.20 wt % chromium, and (ii) 0.20 wt % copper.

8. The weld metal of claim 2 having a yield strength of at least about 690 MPa (100 ksi) and a DBTT lower than about −50° C. (−58° F.) as measured by a Charpy V-notch energy versus temperature curve.

9. The weld metal of claim 5 having a yield strength of at least about 828 MPa (120 ksi) and a DBTT lower than about −70° C. (−94° F) as measured by a Charpy V-notch energy versus temperature curve.

10. The weld metal of claim 2 wherein grains of said acicular ferrite subdivided prior austenite grains during formation of said weld metal.

11. The weld metal of claim 2 wherein said acicular ferrite has been nucleated from oxide inclusions comprising a core of one or more oxide particles, said core having a combined Zr and Ti content of greater than about 50 wt %.

12. The weld metal of claim 2 wherein said acicular ferrite has been nucleated from oxide inclusions comprising a core of one or more oxide particles, said core having a Zr content of greater than about 50 wt %.

13. The weld metal of claim 11 wherein the mean diameter of said oxide particles is less than about 100 nm in diameter.

14. The weld metal of claim 2, wherein said weld metal was produced using a gas metal arc welding process.

15. The weld metal of claim 14, wherein said weld metal was produced using a heat input of between 0.3 and 2.5 kJ/mm.

16. The weld metal of claim 14, wherein said weld metal was produced using a shielding gas comprising carbon dioxide, oxygen, helium, or mixtures thereof and more than about 50 vol % argon.

17. The weld metal of claim 14, wherein said weld metal was produced using pulsed current gas metal arc welding.

18. A method of welding a high strength, low alloy steel to produce a weld metal having a yield strength of at least about 690 MPa (100 ksi) and a DBTT lower than about −50° C. (−58° F.) as measured by a Charpy V-notch energy versus temperature curve comprising the steps of:
    (a) using a gas metal arc welding process; and
    (b) using a welding consumable wire that produces a weld metal microstructure comprising more than 5 vol % to about 45 vol % acicular ferrite and at least about 50 vol % lath martensite, degenerate upper bainite, lower bainite, granular bainite, or mixtures thereof.

19. The method of claim 18, wherein said weld metal comprises iron and the following alloying elements in the weight percents indicated:
    about 0.04 wt % to about 0.08 wt % carbon;
    about 1.0 wt % to about 2.0 wt % manganese;
    about 0.2 wt % to about 0.7 wt % silicon;
    about 0.30 wt % to 0.80 wt % molybdenum;
    about 2.3 wt % to about 3.5 wt % nickel;
    about 0.0175 wt % to about 0.0400 wt % oxygen; and
    at least one additive selected from the group consisting of (i) up to
    about 0.04 wt % zirconium, and (ii) up to about 0.02 wt % titanium.

20. The method of claim 19, wherein said weld metal further comprises the following alloying elements in the weight percents indicated:
    less than about 0.01 wt % phosphorus;
    less than about 0.01 wt % sulfur;
    up to about 0.03 wt % aluminum; and
    less than about 0.020 wt % nitrogen.

21. The method of claim 19, wherein said weld metal further comprises at least one additive selected from the group consisting of (i) 0 wt % to about 0.60 wt % chromium, (ii) 0 wt % to about 0.50 wt % copper, (iii) 0 wt % to about 0.040 wt % vanadium, (iv) 0 wt % to about 0.0012 wt % boron.

* * * * *